United States Patent
Tamao et al.

(10) Patent No.: US 10,343,506 B2
(45) Date of Patent: Jul. 9, 2019

(54) VEHICLE SIDE PORTION STRUCTURE

(71) Applicant: TOYOTA JIDOSHA KABUSHIKI KAISHA, Toyota-shi, Aichi-ken (JP)

(72) Inventors: Junichiro Tamao, Toyota (JP); Masaaki Wakahara, Okazaki (JP); Masayuki Okano, Toyota (JP); Masashi Komada, Yokkaichi (JP); Koki Ikeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 160 days.

(21) Appl. No.: 15/678,473

(22) Filed: Aug. 16, 2017

(65) Prior Publication Data

US 2018/0086188 A1 Mar. 29, 2018

(30) Foreign Application Priority Data

Sep. 29, 2016 (JP) .................................. 2016-192059

(51) Int. Cl.
| | |
|---|---|
| *B60J 10/50* | (2016.01) |
| *B60J 10/86* | (2016.01) |
| *B60J 5/04* | (2006.01) |
| *B62D 25/02* | (2006.01) |

(52) U.S. Cl.
CPC .............. *B60J 10/50* (2016.02); *B60J 5/0418* (2013.01); *B60J 10/86* (2016.02); *B60J 5/04* (2013.01); *B62D 25/025* (2013.01)

(58) Field of Classification Search
CPC . B60J 10/50; B60J 10/86; B60J 5/0418; B60J 5/04
See application file for complete search history.

(56) References Cited

U.S. PATENT DOCUMENTS

| | | | | |
|---|---|---|---|---|
| 4,222,603 | A * | 9/1980 | Breitschwerdt | ......... B60R 13/04 296/146.9 |
| 4,818,014 | A * | 4/1989 | Kaye | ........................ B60J 10/24 24/691 |
| 6,193,306 | B1 * | 2/2001 | Lee | ........................ B62D 25/02 296/181.4 |

(Continued)

FOREIGN PATENT DOCUMENTS

| | | | | |
|---|---|---|---|---|
| FR | 2918016 A1 * | 1/2009 | ............ | B60J 5/0418 |
| JP | 60189680 A * | 9/1985 | ........... | B62D 25/025 |

(Continued)

*Primary Examiner* — Catherine A Kelly
(74) *Attorney, Agent, or Firm* — Oliff PLC

(57) ABSTRACT

In a vehicle side portion structure, a vehicle body-side wall surface, which is a wall surface at a side of an aperture lower edge portion of a door lower space, is formed so as to include a first upper surface, a first corner surface, and a first vertical surface that extends substantially downwards from the first corner surface. The door lower space is formed so as to include a corner upper space, which is a space located at a vehicle upper side of the first corner surface, and a first space, which is a space between a door weather strip and the corner upper space. A width in a vehicle up-down direction of the corner upper space is less than a width in the vehicle transverse direction of the first space, and is also less than a width in the vehicle up-down direction of the first space.

8 Claims, 10 Drawing Sheets

(56) References Cited

U.S. PATENT DOCUMENTS

| | | | | |
|---|---|---|---|---|
| 7,077,450 B2 * | 7/2006 | Kohara | ................. | B60J 5/00 |
| | | | | 296/146.1 |
| 7,168,757 B2 * | 1/2007 | Futatsuhashi | ........... | B60R 13/04 |
| | | | | 296/193.05 |
| 7,896,397 B2 * | 3/2011 | Rompage | ............... | B60R 13/04 |
| | | | | 280/154 |
| 9,162,625 B2 * | 10/2015 | Watanabe | ............... | B60R 13/04 |
| 9,862,309 B2 * | 1/2018 | Oliverio | ............... | F21S 43/237 |
| 2003/0006625 A1 * | 1/2003 | Moriyama | ............ | B60J 5/0412 |
| | | | | 296/146.6 |

FOREIGN PATENT DOCUMENTS

| | | | | |
|---|---|---|---|---|
| JP | 60234021 A | * | 11/1985 | ............ B60J 5/0418 |
| JP | H08-216928 A | | 8/1996 | |
| JP | H09-30260 A | | 2/1997 | |
| JP | 2003-025848 A | | 1/2003 | |
| JP | 2003-276448 A | | 9/2003 | |
| JP | 2005-041333 A | | 2/2005 | |
| JP | 2008-030631 A | | 2/2008 | |
| JP | 2015020451 A | * | 2/2015 | ......... B60R 13/0243 |

* cited by examiner

VEHICLE SIDE PORTION STRUCTURE

CROSS-REFERENCE TO RELATED APPLICATION

This application claims priority under 35 USC 119 from Japanese Patent Application No. 2016-192059 filed Sep. 29, 2016, the disclosure of which is incorporated by reference herein.

BACKGROUND

Technical Field

The technology of the present disclosure relates to a vehicle side portion structure.

Related Art

In a vehicle side portion structure disclosed in Japanese Patent Application Laid-Open (JP-A) No. 2008-030631, a sealing member is provided at a lower end portion of a door in order to seal a gap between the door and a rocker molding and thereby improve noise insulation.

SUMMARY

However, in the aforementioned technology, reaction force generated when the door is being closed is increased by the sealing member provided at the lower end portion of the door, and there is a concern that closing the door will become more difficult. On the other hand, if the sealing member provided at the door lower end portion is simply done away with, then the noise insulation performance deteriorates.

An exemplary embodiment of the technology of the present disclosure provides a vehicle side portion structure that enables noise entering a vehicle cabin interior through a door lower space (i.e., a space formed underneath a door) to be reduced without making it more difficult for the door to be closed.

A vehicle side portion structure according to a first aspect includes an aperture lower edge portion that forms a portion on a vehicle lower side of a door aperture portion provided at a vehicle side portion, a side door that is configured to open and close the door aperture portion, and a door lower space being formed between the side door and the aperture lower edge portion in a state in which the door aperture portion is closed, and a sealing member that seals the door lower space. Moreover, a vehicle body-side wall surface, which is a wall surface at a side of the aperture lower edge portion of the door lower space, is formed so as to include: an upper surface having a normal direction that is substantially towards a vehicle upper side, a corner surface that is formed at an end portion at an outer side in a vehicle transverse direction of the upper surface, and a vertical surface that extends substantially towards a vehicle lower side from the corner surface. Furthermore, the door lower space is formed so as to include a corner upper space, which is a space located at the vehicle upper side of the corner surface, and a first space, which is adjacent to a vehicle outer side of the sealing member, and is a space between the sealing member and the corner upper space. In addition, a width in a vehicle up-down direction of the corner upper space is smaller than a width in the vehicle up-down direction of the first space, and is also smaller than a width in the vehicle transverse direction of the first space.

In the vehicle side portion structure according to the first aspect, a door aperture portion that is provided at a vehicle side portion, and a side door is provided such that it is able to open and close this door aperture portion. In a state in which this side door is closed, a door lower space is formed between the aperture lower edge portion, which forms a vehicle lower side portion of the door aperture portion, and the side door. Additionally, a sealing member that seals the door lower space is also provided.

A vehicle body-side wall surface, which is a wall surface at a side of the aperture lower edge portion of the door lower space, is formed so as to include an upper surface having a normal direction that is substantially towards the vehicle upper side, a corner surface that is formed at an end portion at an outer side in the vehicle transverse direction of the upper surface, and a vertical surface that extends substantially towards the vehicle lower side from the corner surface. In addition, the door lower space is formed so as to include a corner upper space, which is a space located at a vehicle upper side of the corner surface, and a first space, which is adjacent to the vehicle outer side of the sealing member, and is a space between the sealing member and the corner upper space. Furthermore, a width in the vehicle up-down direction of the corner upper space is smaller than a width in the vehicle up-down direction of the first space, and is also smaller than a width in the vehicle transverse direction of the first space.

Because the above-described structure is employed, the first space is formed in front of the sealing member on a path by which noise from outer side the vehicle enters into the vehicle cabin interior through the door lower space, and the corner upper space whose perpendicular cross-sectional area relative to the noise entry path is less than that of the first space is formed in front of the first space.

Because of this, a portion of the noise entering the door lower space from outer side the vehicle is absorbed by the sealing member, and a portion thereof is reflected. The reflected portion of the noise is once again reflected between the first space and the corner upper space. In this way, because a mechanism that reflects noise both in front of and behind the first space is provided, noise from outer side the vehicle entering the vehicle cabin interior can be reduced by employing the same principle as that used in an expansion silencer.

Moreover, as is described above, the width in the vehicle up-down direction of the corner upper space is smaller than both the width in the vehicle up-down direction and the width in the vehicle transverse direction of the first space.

Here, because the width in the vehicle transverse direction of the door lower space, the width in the vehicle up-down direction thereof can be designed without having to consider over stroke requirements of the side door (in other words, the width required to prevent the side door making contact with the vehicle body when the side door is closed), this width can be designed as a comparatively narrow width.

Because of this, it is easy to design a large cross-sectional area ratio of the first space relative to the corner upper space (i.e., a ratio of the cross-sectional area that is perpendicular to the noise entry path). Accordingly, the noise insulation effect can be improved efficiently.

A vehicle side portion structure according to a second aspect is characterized in that, in the vehicle side portion structure according to the first aspect, the vehicle body-side wall surface is formed so as to further include a seal-contacting vertical surface that extends substantially towards the vehicle upper side from an end portion on the inner side in the vehicle transverse direction of the upper surface, and whose upper portion is abutted against by the sealing member.

In the vehicle side portion structure according to the second aspect, a seal-contacting vertical surface is provided extending substantially towards the vehicle upper side from an end portion on the inner side in the vehicle transverse direction of the upper surface. The sealing member contacts with the upper portion of this seal-contacting vertical surface.

As a consequence, because the first space is formed on the outer side in the vehicle transverse direction of the lower portion of the seal-contacting vertical surface, which the sealing member does not contact, a large first space can be formed. Accordingly, the noise insulation effect can be improved even more efficiently.

A vehicle side portion structure according to a third aspect is characterized in that, in the vehicle side portion structure according to the first or second aspects, the vehicle body-side wall surface is formed so as to further include a second upper surface that extends outwards in the vehicle transverse direction from an end portion on the vehicle lower side of the vertical surface, and a second vertical wall that extends towards the vehicle lower side from an end portion on the outer side in the vehicle transverse direction of the second upper surface.

In the vehicle side portion structure according to the third aspect, a second upper surface that extends outwards in the vehicle transverse direction from an end portion on the vehicle lower side of the vertical surface is provided, and a second vertical wall that extends towards the vehicle lower side from an end portion on the outer side in the vehicle transverse direction of this second upper surface is provided.

Because of this, it is possible to efficiently reduce the cross-sectional area of the door lower space that is perpendicular to the noise entry path. Accordingly, the noise insulation effect can be improved even more efficiently.

A vehicle side portion structure according to a fourth aspect is characterized in that, in the vehicle side portion structure according to the first or second aspects, the vehicle body-side wall surface is formed so as to further include a recessed surface that is provided on the vehicle lower side of the vertical surface and is recessed further inwards in the vehicle transverse direction than the vertical surface, and a width of the door lower space measured in the vehicle transverse direction from the recessed surface is larger than a width of the door lower space measured in the vehicle transverse direction from the vertical surface.

In the vehicle side portion structure according to the fourth aspect, a recessed surface that is recessed further inwards in the vehicle transverse direction than the vertical surface is provided on the vehicle lower side of the vertical surface. In addition, the width of the door lower space measured in the vehicle transverse direction from the recessed surface is greater than the width of the door lower space measured in the vehicle transverse direction from the vertical surface.

Because of this, a portion of the noise entering from the vehicle exterior is reflected between the enlarged door lower space located on the outer side in the vehicle transverse direction of the recessed surface and the door lower space located on the outer side in the vehicle transverse direction of the vertical surface. Accordingly, the noise insulation effect can be improved even more efficiently.

A vehicle side portion structure according to a fifth aspect is characterized in that, in the vehicle side portion structure according to the fourth aspect, the recessed surface is formed so as to include a lower surface that extends inwards in the vehicle transverse direction from an end portion on the vehicle lower side of the vertical surface, and the lower surface is inclined relative to the vehicle front-rear direction.

In the vehicle side portion structure according to the fifth aspect, a lower surface is provided extending inwards in the vehicle transverse direction from an end portion on the vehicle lower side of the vertical surface. In addition, this lower surface is inclined relative to the vehicle front-rear direction.

Because of this, any water that runs along the vertical surface and drips onto the lower surface runs along this lower surface which slopes in the vehicle front-rear direction, and flows towards one side in the vehicle front-rear direction. Accordingly, drainage is excellent.

A vehicle side portion structure according to a sixth aspect is characterized in that, in the vehicle side portion structure according to the fifth aspect, the side door is a hinged door that is provided with hinges on one side in the vehicle front-rear direction, and the lower surface is inclined relative to the vehicle downward direction towards one side in the vehicle front-rear direction.

In the vehicle side portion structure according to the sixth aspect, the side door is a hinged door that is provided with hinges on one side in the vehicle front-rear direction. In addition, the lower surface is inclined relative to the vehicle downward direction towards one side in the vehicle front-rear direction.

Because of this, any water flowing along the lower surface flows towards the side in this vehicle front-rear direction where the side door hinges are provided. Accordingly, it is difficult for water to drip onto the feet of a person getting into or out of a vehicle.

A vehicle side portion structure according to a seventh aspect is characterized in that, in the vehicle side portion structure according to any one of the first through sixth aspects, a lower end portion of the side door faces the aperture lower edge portion in the vehicle up-down direction to form a vehicle outer side gap portion, and at least one of a portion of the side door or a portion of the aperture lower edge portion is provided on a virtual straight line connecting the vehicle outer side gap portion with the sealing member on a cross-section that is perpendicular relative to the vehicle front-rear direction.

In the vehicle side portion structure according to the seventh aspect, a lower end portion of the side door faces the aperture lower edge portion in the vehicle up-down direction to form a vehicle outer side gap portion. In addition, at least one of a portion of the side door and a portion of the aperture lower edge portion is provided on a virtual straight line connecting the vehicle outer side gap portion with the sealing member on a cross-section that is perpendicular relative to the vehicle front-rear direction.

Because of this, it is difficult for water entering though the vehicle outer side gap portion to directly reach the sealing member. Accordingly, it is difficult for water to enter the vehicle cabin interior.

As has been described above, an exemplary embodiment of the technology of the present disclosure has the superior effect that it enables noise entering a vehicle cabin interior through a door lower space to be reduced without making it more difficult for the door to be closed.

BRIEF DESCRIPTION OF THE DRAWINGS

Exemplary embodiments of the present invention will be described in detail based on the following figures, wherein.

DETAILED DESCRIPTION

First Embodiment

Figure 1:
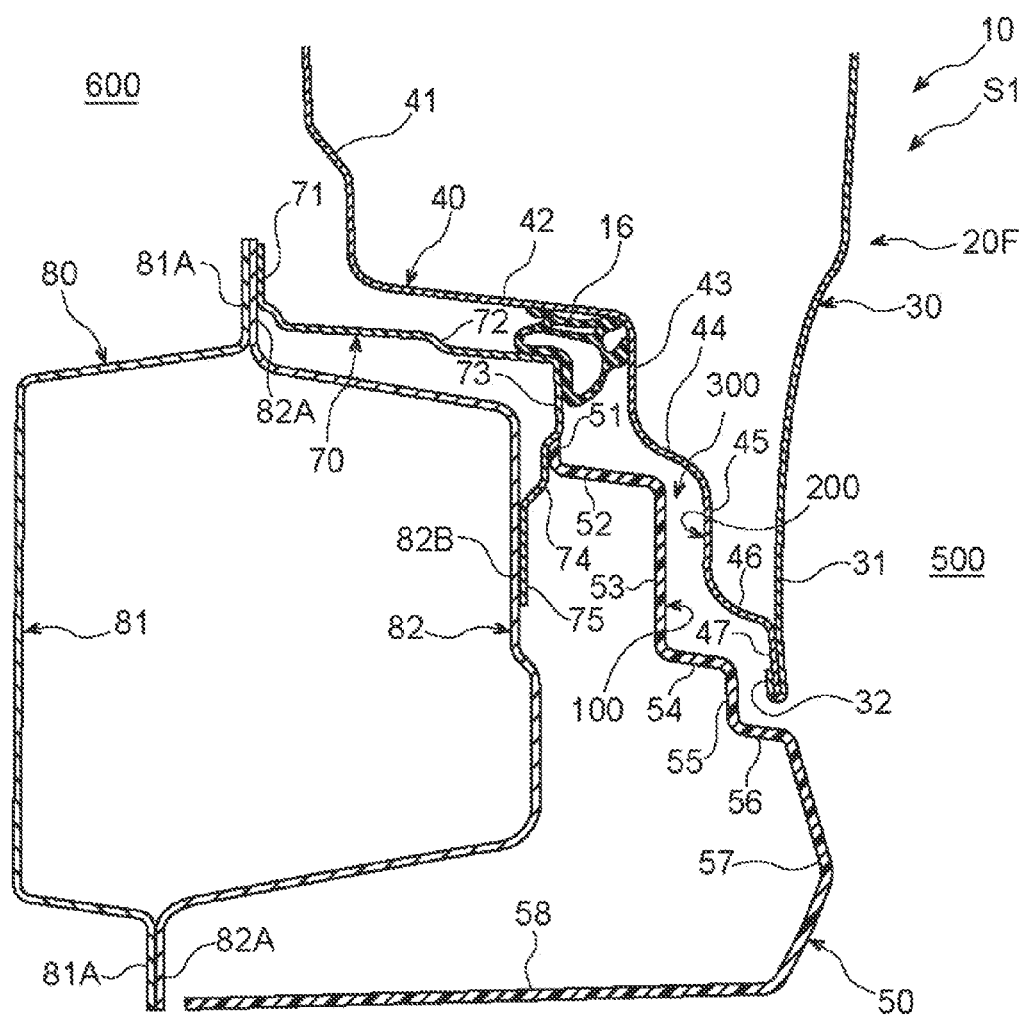
FIG. 1 is a view showing a cross-section taken along a plane which is perpendicular to the vehicle front-rear direction (i.e., is a cross-sectional view taken along a line 1-1 in FIG. 3) showing a vehicle side portion structure of a first exemplary embodiment.

Hereinafter, a vehicle 10 in which a vehicle side portion structure S1 according to a first exemplary embodiment of the technology of the present disclosure has been employed will be described.

Note that an arrow FR, an arrow UP, and an arrow OUT that are shown where appropriate in the drawings respectively indicate a vehicle front side, a vehicle upper side, and an outer side in a vehicle transverse direction. Hereinafter, unless specifically stated otherwise, if simple front-rear, up-down, inner-outer, or left-right directions are used, then these refer respectively to the front-rear direction of the vehicle, the up-down direction of the vehicle, the inner side and the outer side in the vehicle transverse direction, and the left and the right in the vehicle transverse direction in a case in which the vehicle is facing in the direction of forward travel.

Figure 3:
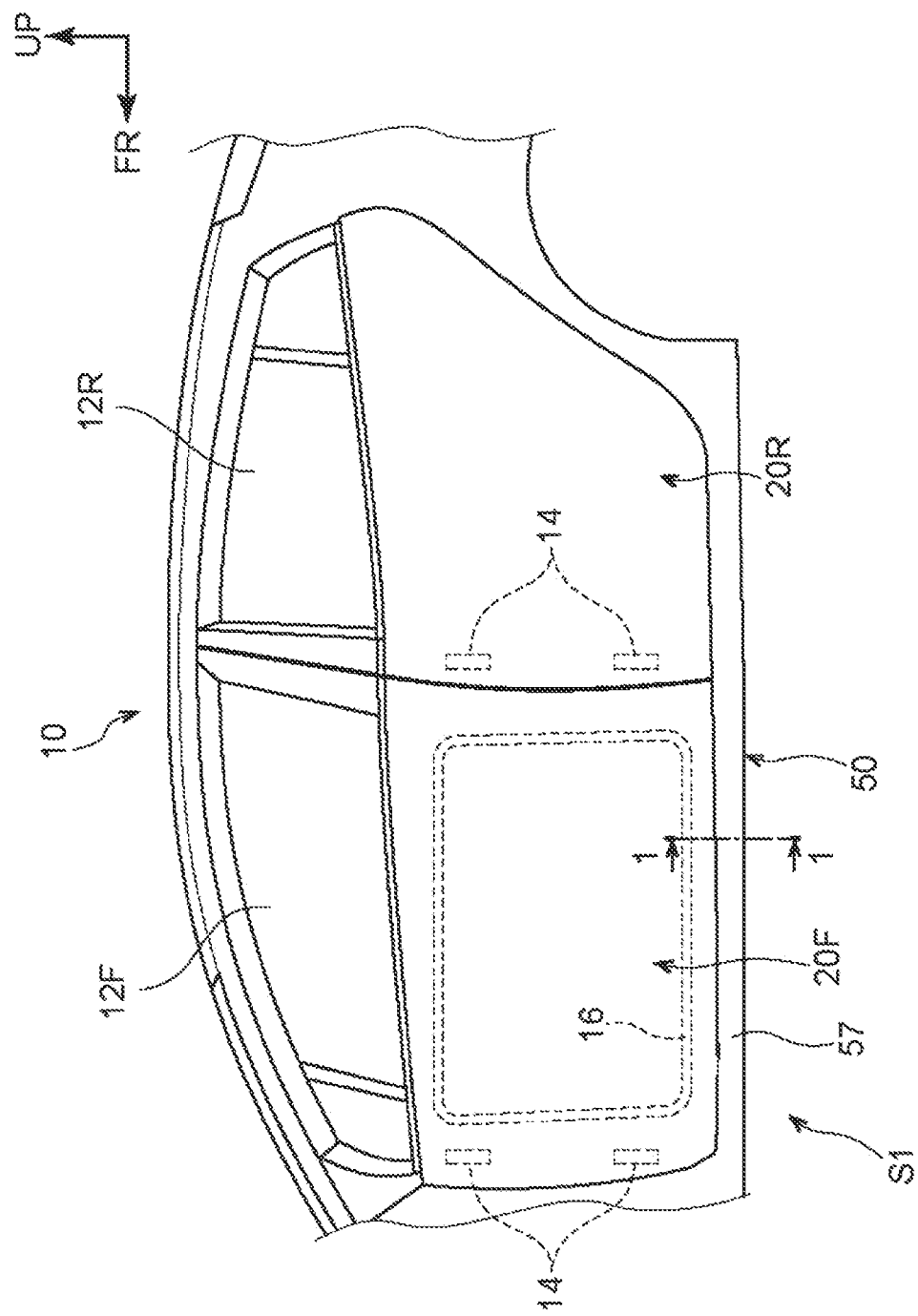
FIG. 3 is a side view of a vehicle in which the vehicle side portion structure of the first exemplary embodiment has been employed.

In FIG. 3, a side portion on a left side of the vehicle 10 is shown. As an example, as is shown in FIG. 3, a front side-door 20F and a rear side-door 20R are provided at the side portion of the vehicle 10.

The front side-door 20F is provided such that it is able to open and close a front side-door aperture portion 12F that is provided in the vehicle side portion. The front side-door aperture portion 12F is a door aperture portion that is used by a person to get into or out of a front seat (in the present exemplary embodiment, either a driver's seat or a passenger's seat). Note that the front side-door aperture portion 12F is an example of a 'door aperture portion' according to the technology of the present disclosure. In addition, the front side-door 20F is an example of a 'side door' according to the technology of the present disclosure.

The rear side-door 20R is provided such that it is able to open and close a rear side-door aperture portion 12R that is provided at the vehicle side portion. The rear side-door aperture portion 12R is a door aperture portion that is used by a person to get into or out of a rear seat. The rear side-door aperture portion 12R is provided on the vehicle rear side of the front side-door aperture portion 12F. A center pillar (i.e., a B pillar: not shown in the drawings) is provided between the front side-door aperture portion 12F and the rear side-door aperture portion 12R.

The front side-door 20F and the rear side-door 20R are both hinged doors that are supported at a vehicle body via hinges 14 that are provided at a vehicle front side portion of the respective side-doors. The front side-door 20F and the rear side-door 20R are both able to rotate around rotation shafts that extend substantially in the vehicle up-down direction and are located in the vehicle front side portion of the respective side-doors.

In FIG. 1, a cross-sectional view (i.e., a cross-sectional end view) taken along a line 1-1 in FIG. 3 is shown. As an example, as is shown in FIG. 1, a rocker 80 having a closed cross-sectional structure that extends in the vehicle front-rear direction is provided in a lower portion of the vehicle side portion. The rocker 80 is formed by joining together a hat-shaped rocker inner panel 81 that is open on the outer side in the vehicle transverse direction, and a hat-shaped rocker outer panel 82 that is open on the inner side in the vehicle transverse direction via flange portions 81A and 82A of the respective rocker panels.

A side outer panel 70 is joined to the rocker 80. The side outer panel 70 is provided with an upper-side joining portion 71, and the upper-side joining portion 71 is joined to a surface on the outer side in the vehicle transverse direction of the flange portion 82A on the upper side of the rocker outer panel 82. A top wall portion 72 is provided extending outwards in the vehicle transverse direction from an end portion on the lower side of the upper-side joining portion 71. A side wall portion 73 is provided extending downwards from an end portion on the outer side in the vehicle transverse direction of the top wall portion 72. A step portion 74 that is displaced towards the inner side in the vehicle transverse direction is provided on the lower side of the side wall 73. A lower-side joining portion 75 that is provided on the lower side of the step portion 74 is joined to a side wall 82B of the rocker outer panel 82. As a consequence, the side outer panel 70 covers a portion of the rocker 80 (i.e., a portion thereof on the vehicle upper side and the outer side in the vehicle transverse direction).

A rocker molding 50 is provided on the outer side in the vehicle transverse direction of the rocker 80 so as to cover a portion of the rocker 80 from the outer side in the vehicle transverse direction. The rocker molding 50 is formed from resin, and has a cross-sectional configuration that is open on the inner side in the vehicle transverse direction. An end portion on one side (i.e., on the vehicle upper side) of the cross-sectional configuration of the rocker molding 50 is disposed at the lower side of the side wall portion 73 of the side outer panel 70, while an end portion on another side (i.e., on the lower side) thereof is disposed on the outer side on the vehicle transverse direction of the flange portion 82A on the lower side of the rocker outer panel 82. Note that both the rocker molding 50 and the side outer panel 70 are examples of an aperture lower edge portion according to the technology of the present disclosure.

As a consequence, the rocker outer panel 82 of the rocker 80 is covered from the outer side in the vehicle transverse direction by the side outer panel 70 and the rocker molding 50. Hereinafter, the side outer panel 70 and the rocker molding 50 may also be referred to as an 'aperture lower edge portion'.

The front side-door 20F is formed so as to include a door outer panel 30 and a door inner panel 40. The door outer panel 30 forms an outermost portion in the vehicle transverse direction of the front side-door 20F, and when the front side-door 20F is shut, the door outer panel 30 also forms a portion of the design surface when the vehicle 10 is viewed from the side. The door inner panel 40 is provided on the inner side in the vehicle transverse direction of the door outer panel 30.

As an example, as is shown in FIG. 1, when the front side-door 20F is closed, a space 300 (hereinafter, this will be referred to as a 'door lower space 300') is formed between the aperture lower edge portion (i.e., the side outer panel 70 and the rocker molding 50) and the front side-door 20F.

A door weather strip (hereinafter, this is abbreviated to a 'door WS') 16 is provided as a 'sealing member' to seal the door lower space 300. The door WS 16 is fixed to the door inner panel 40 of the front side-door 20F, and in a state in which the front side-door 20F is closed, the door WS 16 is pressed against an upper portion of the side wall portion 73 and against an outer portion in the vehicle transverse direction of the top wall portion 72 of the side outer panel 70. The door WS 16 is formed having a hollow tube-shaped structure. The door lower space 300 is divided into a vehicle cabin interior 600 side and a vehicle exterior 500 side by the door WS 16. Note that, as is shown in FIG. 3, the door WS 16 is disposed in a toroidal shape as seen in a vehicle side view, and the portion of the door WS 16 that is shown in FIG. 1 is a lower portion of this toroidal shape.

A folded portion 32 that is folded inwards in the vehicle transverse direction is formed at a lower end portion of the door outer panel 30. In addition, a flange portion 47 provided at the lower end portion of the door inner panel 40 is nipped between a main body portion 31 and the folded portion 32 of the door outer panel 30. As a consequence, the door outer panel 30 and the door inner panel 40 are joined together in what is known as a hemming joint.

An outer side step portion 46 is provided extending from a top end of the flange portion 47 of the door inner panel 40 diagonally inwards in the vehicle transverse direction and towards the vehicle upper side. An outer side vertical wall portion 45 is provided extending towards the vehicle upper side from an upper end of the outer side step portion 46, and an inner side step portion 44 is provided extending from a top end of the outer side vertical wall portion 45 diagonally inwards in the vehicle transverse direction and towards the vehicle upper side. In addition, an inner side vertical wall portion 43 is provided extending towards the vehicle upper side from an upper end of the inner side step portion 44, and a bulge portion 42 is provided extending inwards in the vehicle transverse direction from an upper end of the inner side vertical wall portion 43. Furthermore, a bulge base portion 41 is provided extending towards the vehicle upper side from an end portion on the inner side in the vehicle transverse direction of the bulge portion 42.

The door WS 16 is provided in the vicinity of a boundary between the inner side vertical wall portion 43 and the bulge portion 42. Specifically, the door WS 16 is fixed to an upper portion of the inner side vertical wall portion 43 and an outer portion in the vehicle transverse direction of the bulge portion 42.

The rocker molding 50 is formed so as to include a portion (this portion is not shown in FIG. 3) that is hidden from the vehicle exterior side by the front side-door 20F in a state in which the front side door 20F is closed, and a portion (this portion is shown in FIG. 3) that is not hidden by the front side-door 20F even in a state in which the front side-door 20F is closed.

This portion that is not hidden is formed so as to include a side wall portion 57. The side wall portion 57 is a portion disposed below the door outer panel 30 in a state in which the closed front side-door 20F is viewed from the side of the vehicle. As is shown in FIG. 1, the side wall portion 57 is shaped so as to substantially conform to a virtual surface that would be formed if the main body portion 31 of the door outer panel 30 were extended downwards in a state in which the front side-door 20F is closed. A base wall portion 58 extends inwards in the vehicle transverse direction from a lower end of the side wall portion 57.

Next, the aforementioned hidden portion will be described.

A bottommost base wall 56 whose plate thickness direction is substantially in the vehicle up-down direction is formed extending inwards in the vehicle transverse direction from an upper end of the side wall portion 57. A second vertical wall portion 55 whose plate thickness direction is substantially in the vehicle transverse direction is formed extending towards the vehicle upper side from an end portion on the inner side in the vehicle transverse direction of the bottommost base wall 56. A second upper wall portion 54 whose plate thickness direction is substantially in the vehicle up-down direction is formed extending inwards in the vehicle transverse direction from an upper end of the second vertical wall portion 55. A first vertical wall portion 53 whose plate thickness direction is substantially in the vehicle transverse direction is formed extending towards the vehicle upper side from an end portion on the inner side in the vehicle transverse direction of the second upper wall portion 54. A first upper wall portion 52 whose plate thickness direction is substantially in the vehicle up-down direction is formed extending inwards in the vehicle transverse direction from an upper end of the first vertical wall portion 53. An uppermost portion 51 whose plate thickness direction is substantially in the vehicle transverse direction is formed extending towards the vehicle upper side from an end portion on the inner side in the vehicle transverse direction of the first upper wall portion 52. The uppermost portion 51 is disposed on the lower side of the side wall portion 73 of the side outer panel 70.

(Door Lower Space 300)

Next, using FIG. 2, which is an enlargement of FIG. 1, the door lower space 300 will be described in detail.

Specifically, after firstly describing a wall surface 200 on the door side of the door lower space 300 (hereinafter, this will be referred to simply as a door-side wall surface 200), and a wall surface 100 on the vehicle body side of the door lower space 300 (hereinafter, this will be referred to simply as a vehicle body-side wall surface 100), a gap (i.e., a dimensional relationship) between the vehicle body-side wall surface 100 and the door-side wall surface 200 will be described.

(Door-Side Wall Surface)

In the present exemplary embodiment, as an example, as is shown in FIG. 1, external surfaces of the bulge portion 42, the inner side vertical wall portion 43, the inner side step portion 44, the outer side vertical wall portion 45, the outer side step portion 46, and the flange portion 47 of the door inner panel 40, and also of the folded portion 32 of the door outer panel 30 make up the door-side wall surface 200.

(Structure of the Door-Side Wall Surface)

Figure 2:
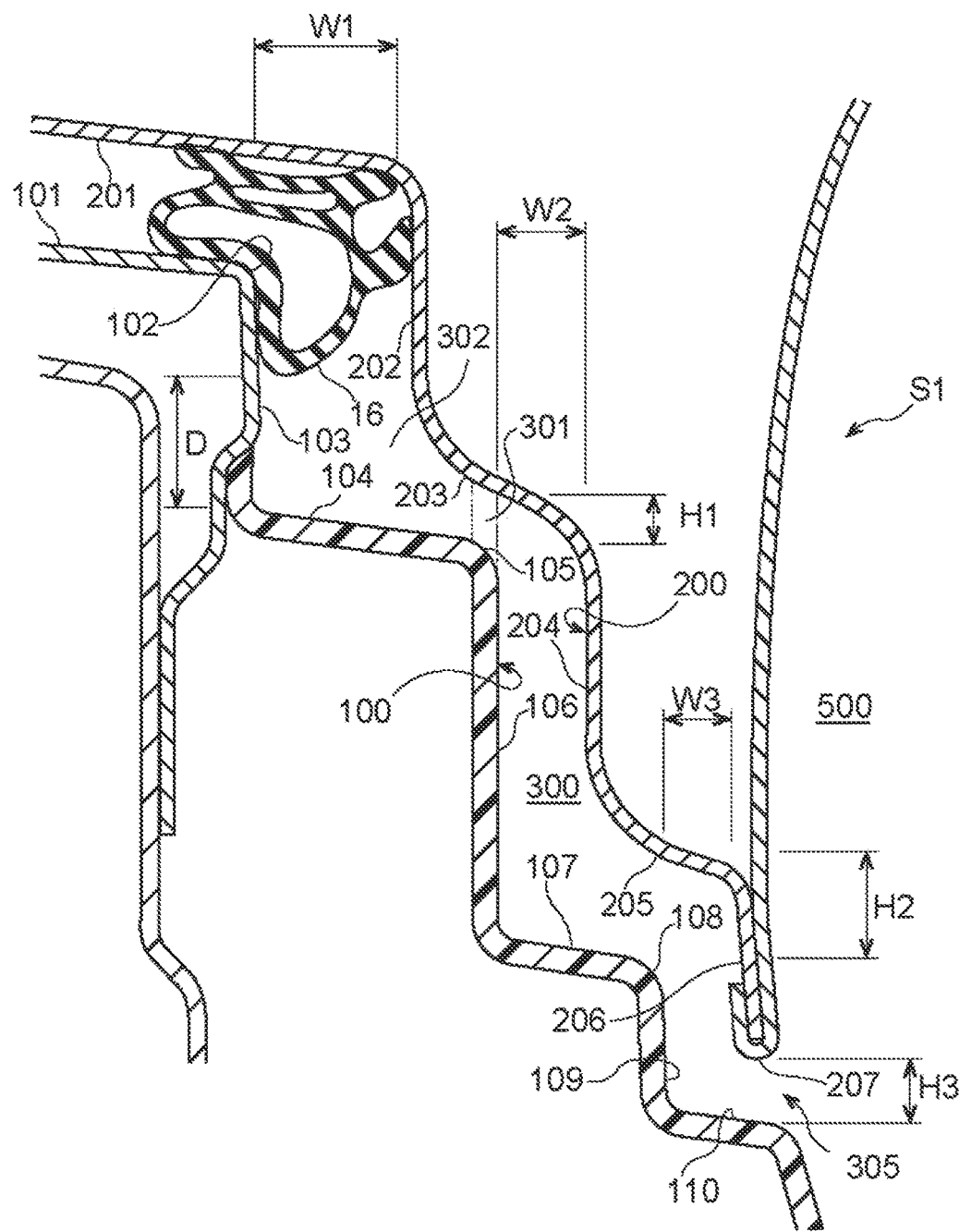
FIG. 2 is an enlarged view showing principal portions of FIG. 1.

As an example, as is shown in FIG. 2, the door-side wall surface 200 is formed by a bulge surface 201, an inner side vertical surface 202, an inner side step surface 203, an outer side vertical surface 204, an outer side step surface 205, an outermost vertical surface 206, and a bottommost surface 207.

The bulge surface 201 is an external surface of the bulge portion 42 of the door inner panel 40, and forms an uppermost portion in the vehicle up-down direction of the door-side wall surface 200. A normal direction of the bulge surface 201 is substantially downwards. The door WS 16 is fixed to an end portion on the outer side in the vehicle transverse direction of the bulge surface 201.

The inner side vertical surface 202 is provided so as to be continuous with an outer side in the vehicle transverse direction of the bulge surface 201. The inner side vertical surface 202 is an external surface of the inner side vertical wall portion 43 of the door inner panel 40. A normal direction of the inner side vertical surface 202 is inwards in the vehicle transverse direction. The door WS 16 is fixed to a vehicle upper side of the inner side vertical surface 202.

The inner side step surface 203 is provided so as to be continuous with a lower side of the inner side vertical surface 202. The inner side step surface 203 is an external surface of the inner side step portion 44 of the door inner panel 40, and slopes downwards and towards the outer side in the vehicle transverse direction. Specifically, an upper portion of the inner side step surface 203 is formed as a curved surface that is convex relative to the door lower space 300, while a lower portion thereof is formed as a curved surface that is concave relative to the door lower space 300.

The outer side vertical surface 204 is provided so as to be continuous with a lower side of the inner side step surface 203. The outer side vertical surface 204 is an external surface of the outer side vertical wall portion 45 of the door inner panel 40, and a normal direction thereof is inwards in the vehicle transverse direction.

The outer side step surface 205 is provided so as to be continuous with a lower side of the outer side vertical surface 204. The outer side step surface 205 is an external surface of the outer side step portion 46 of the door inner panel 40, and slopes downwards and towards the outer side in the vehicle transverse direction. Specifically, the outer side step surface 205 is formed as a curved surface that is convex relative to the door lower space 300.

The outermost vertical surface 206 is provided so as to be continuous with a lower side of the outer side step surface 205. An upper portion of the outermost vertical surface 206 is an external surface of the flange portion 47 of the door inner panel 40, while a lower portion of the outermost vertical surface 206 is an external surface of the folded portion 32 of the door outer panel 30. A normal direction of the outermost vertical surface 206 is substantially inwards in the vehicle transverse direction.

The bottommost surface 207 is provided so as to be continuous with a lower end of the outermost vertical surface 206. The bottommost surface 207 is an external surface of a lower end of the folded portion 32 of the door outer panel 30, and a normal direction thereof is substantially downwards.

(Vehicle Body-Side Wall Surface)

In contrast, as an example, as is shown in FIG. 1, external surfaces of the top wall portion 72 and the side wall portion 73 of the side outer panel 70, and also of a portion (i.e., the portion that is hidden from the vehicle exterior side by the front side-door 20F) of the rocker molding 50 make up the vehicle body-side wall surface 100.

(Structure of the Vehicle Body-Side Wall Surface)

As an example, as is shown in FIG. 2, the vehicle body-side wall surface 100 is formed by a top surface 101, a seal-contacting corner surface 102, a seal-contacting vertical surface 103, a first upper surface 104, a first corner surface 105, a first vertical surface 106, a second upper surface 107, a second corner surface 108, a second vertical surface 109, and a bottommost base surface 110. Note that the first upper surface 104 is an example of an 'upper surface' according to the technology of the present disclosure, the first corner surface 105 is an example of a 'corner surface' according to the technology of the present disclosure, and the first vertical surface 106 is an example of a 'vertical surface' according to the technology of the present disclosure.

The top surface 101 forms an uppermost portion in the vehicle up-down direction of the vehicle body-side wall surface 100. The top surface 101 is an external surface of the top wall portion 72 of the side outer panel 70, and a normal direction thereof is substantially towards the vehicle upper side. The top surface 101 faces the bulge surface 201 of the door-side wall surface 200 in the vehicle up-down direction. The door WS 16 contacts a portion on the outer side in the vehicle transverse direction of the top surface 101.

The seal-contacting corner surface 102 is provided so as to be continuous with the outer side in the vehicle transverse direction of the top surface 101. The seal-contacting corner surface 102 is an external surface of a boundary portion between the top wall portion 72 and the side wall portion 73 of the side outer panel 70. The door WS 16 contacts the seal-contacting corner portion 102.

The seal-contacting vertical surface 103 is provided at a lower side of the seal-contacting corner surface 102. A normal direction of the seal-contacting vertical surface 103 is outwards in the vehicle transverse direction. An upper portion of the seal-contacting vertical surface 103 is an external surface of the side wall portion 73 of the side outer panel 70, while a lower portion of the seal-contacting vertical surface 103 is an external surface of the uppermost portion 51 of the rocker molding 50. The door WS 16 contacts a portion on the vehicle upper side of the seal-contacting vertical surface 103. The seal-contacting vertical surface 103 faces the inner side vertical surface 202 and the inner side step surface 203 of the door-side wall surface 200 in the vehicle transverse direction.

The first upper surface 104, which is serving as an 'upper surface', is provided facing outwards in the vehicle transverse direction from an end portion on the lower side of the seal-contacting vertical surface 103. The first upper surface 104 is an external surface of the first upper wall portion 52 of the rocker molding 50, and a normal direction thereof is substantially towards the vehicle upper side. More specifically, the first upper surface 104 slopes slightly downwards and outwards in the vehicle transverse direction. A portion on the inner side in the vehicle transverse direction of the first upper surface 104 faces the door WS 16 in the vehicle up-down direction, and a portion on the outer side in the vehicle transverse direction of the first upper surface 104 faces a portion on the inner side in the vehicle transverse direction of the first step portion 74 in the vehicle up-down direction.

The first corner surface 105, which is serving as a 'corner surface', is provided on the outer side in the vehicle transverse direction of the first upper surface 104. The first corner surface 105 is an external surface of a boundary portion between the first upper wall portion 52 and the first vertical wall portion 53 of the rocker molding 50. The first corner surface 105 faces a portion of the inner side step surface 203 of the door-side wall surface 200 in the vehicle up-down direction.

The first vertical surface 106, which is serving as a 'vertical surface', is provided facing downwards from the first corner surface 105. The first vertical surface 106 is an external surface of the first vertical wall portion 53 of the rocker molding 50, and a normal direction thereof is outwards in the vehicle transverse direction. The first vertical surface 106 faces the outer side vertical surface 204, the outer side step portion 205, and the outermost vertical surface 206 of the door-side wall surface 200 in the vehicle transverse direction.

The second upper surface 107 is provided facing outwards in the vehicle transverse direction from an end portion on the lower side of the first vertical surface 106. The second upper surface 107 is an external surface of the second upper wall portion 54 of the rocker molding 50, and a normal direction thereof is substantially towards the vehicle upper side. More specifically, the second upper surface 107 slopes downwards and outwards in the vehicle transverse direction.

The second corner surface 108 is provided on an end portion on the outer side in the vehicle transverse direction of the second upper surface 107. The second corner surface 108 is an external surface of a boundary portion between the second upper wall portion 54 and the second vertical wall portion 55 of the rocker molding 50. The second corner surface 108 faces a portion of the outer side step surface 205 of the door-side wall surface 200 in the vehicle up-down direction.

The second vertical surface 109 is provided facing downwards from the second corner surface 108. The second vertical surface 109 is an external surface of the second vertical wall portion 55 of the rocker molding 50, and a normal direction thereof is outwards in the vehicle transverse direction. The second vertical surface 109 faces a portion of the outermost vertical surface 206 of the door-side wall surface 200 in the vehicle transverse direction.

The bottommost base surface 110 is provided facing outwards in the vehicle transverse direction from an end portion on the lower side of the second vertical surface 109. The bottommost base surface 110 is an external surface of the bottommost base wall 56 of the rocker molding 50, and a normal direction thereof faces substantially towards the vehicle upper side. More specifically, the bottommost base surface 110 slopes downwards and outwards in the vehicle transverse direction. The bottommost base surface 110 faces the outer side step surface 205 and the bottommost surface 207 of the door-side wall surface 200 in the vehicle up-down direction.

(Width of the Door Lower Space)

Next, the gap (i.e., the dimensional relationship) between the vehicle body-side wall surface 100 and the door-sidewall surface 200 will be described.

Note that, as an example, as is shown in FIG. 2, a gap in the vehicle transverse direction between the seal-contacting vertical surface 103 and the inner side vertical surface 202 is taken as a gap W1, a gap in the vehicle transverse direction between the first vertical surface 106 and the outer side vertical surface 204 is taken as a gap W2, and a gap in the vehicle transverse direction between the second vertical surface 109 and the outermost vertical surface 206 is taken as a gap W3.

Moreover, a gap in the vehicle up-down direction between the first corner surface 105 and the inner side step surface 203 is taken as H1, a gap in the vehicle up-down direction between the second corner surface 108 and the inner side step surface 205 is taken as H2, and a gap in the vehicle up-down direction between the bottommost base surface 110 and the bottommost surface 207 is taken as H3. Note that the gap H1 is an example of a 'width in the vehicle up-down direction of a corner upper space' according to the technology of the present disclosure.

However, it is not essential that the mutually facing surfaces that define the aforementioned gaps are in a parallel relationship with each other. Because of this, the gaps in the vehicle transverse direction vary depending on the position in the vehicle up-down direction where they are measured, and the gaps in the vehicle up-down direction vary depending on the position in the vehicle transverse direction where they are measured. In this case, each of the gap W1, the gap W2, the gap W3, the gap H1, and the gap H2 refer to the minimum value of the gap measured in a portion where the vehicle body-side wall surface 100 and the door-side wall surface 200 are facing each other.

Moreover, of the door lower space 300, a space positioned on the vehicle upper side of the first corner surface 105 is referred to as a corner upper space 301, while a space between the corner upper space 301 and the door WS 16 is referred to as a first space 302.

Note that the gap W1 is an example of a 'width in the vehicle transverse direction of a first space' according to the technology of the present disclosure.

The gap W1, the gap W2, and the gap W3 in the vehicle transverse direction are set after considering the over stroke requirements of the side door (namely, the gap required to prevent the side door from interfering with the vehicle body when the side door is closed). Because of this, in the present exemplary embodiment, the gap W1, the gap W2, and the gap W3 are all set as gaps of not less than 11 mm.

In contrast to this, there is no need to consider the door over stroke requirements when setting the gap H1 and the gap H2 in the vehicle up-down direction. Accordingly, compared to the gap W1, the gap W2, and the gap W3 in the vehicle transverse direction, the gap H1 and the gap H2 in the vehicle up-down direction can be set as narrow gaps. Specifically, the following relationships are established.

Namely, the gap H1 is smaller than the gap W1 (H1<W1), specifically, the gap H1 is one half or less the size of the gap W1. In other words, the width H1 in the vehicle up-down direction of the corner upper space 301 is smaller than the width W1 in the vehicle transverse direction of the first space 302.

Furthermore, a gap D in the vehicle up-down direction between the first upper surface 104 and the door WS 16 is larger than the gap H1. In other words, the width H1 in the vehicle up-down direction of the corner upper space 301 is smaller than the width D in the vehicle up-down direction of the first space 302.

Accordingly, the width H1 in the vehicle up-down direction of the corner upper space 301 is smaller than the width W1 in the vehicle transverse direction of the first space 302, and is smaller than the width D in the vehicle up-down direction of the first space 302.

Note that the gap D is an example of a 'width in the vehicle up-down direction of a first space' according to the technology of the present disclosure.

Moreover, in the present exemplary embodiment, the gap H1 is smaller than the gap W2 (H1<W2), and is also smaller than the gap W3 (H1<W3). In addition, the gap H3 is smaller than the gap W2 (H1<W2), and is also smaller than the gap W3 (H1<W3).

[Operational Effects]

Next, operational effects of the vehicle side portion structure according to the first exemplary embodiment will be described.

In the vehicle side portion structure S1 of the first exemplary embodiment, the front side-door aperture portion 12F is provided in a vehicle side portion, and the front side-door 20F is provided such it is able to open and close this front side-door aperture portion 12F. As an example, as is shown in FIG. 1, in a state in which the front side-door 20F is closed, the door lower space 300 is formed between the aperture lower edge portion (i.e., the side outer panel 70 and the rocker molding 50) that forms the vehicle lower side portion of the front side-door aperture portion 12F and the front side-door 20F. Furthermore, the door WS 16 is provided to seal the door lower space 300.

As an example, as is shown in FIG. 2, the vehicle body-side wall surface 100, which is the wall surface on the aperture lower edge portion-side of the door lower space 300, is formed so as to include the first upper surface 104 whose normal direction faces substantially towards the vehicle upper side, the first corner surface 105 that is formed on an end portion on the outer side in the vehicle transverse direction of the first upper surface 104, and the first vertical surface 106 that extends substantially downwards from the first corner surface 105. The door lower space 300 is formed so as to include the corner upper space 301, which is the space positioned on the vehicle upper side of the first corner surface 105, and the first space 302, which is adjacent to the vehicle outer side of the door WS 16 and is the space between the door WS 16 and the corner upper space 301. Furthermore, the width H1 in the vehicle up-down direction of the corner upper space 301 is smaller than the width W1 in the vehicle transverse direction of the first space 302, and is also smaller than the width D in the vehicle up-down direction of the first space 302.

Because a structure such as that described above is employed, the first space 302 is formed in front of the door WS 16 on the path by which noise from the vehicle exterior 500 enters into the vehicle cabin interior 600 through the door lower space 300, and the corner upper space 301 whose perpendicular cross-sectional area relative to the noise entry path is smaller than that of the first space 302 is formed in front of the first space 302. In other words, a space having an enlarged cross-sectional area perpendicular to the noise entry path is formed in front of the door WS 16, and a space having a reduced cross-sectional area perpendicular to the noise entry path is also formed in front of the door WS 16.

Because of this, a portion of the noise entering into the door lower space 300 from the vehicle exterior 500 is absorbed by the door WS 16, and a portion thereof is reflected. The reflected portion of the noise is once again reflected between the first space 302 and the corner upper space 301. In this way, because a mechanism that reflects noise both in front of and behind the first space 302 is provided, noise from the vehicle exterior 500 entering into the vehicle cabin interior 600 can be reduced by employing the same principle as that used in an expansion silencer.

Here, a supplementary description of the principle behind an expansion silencer will be given.

Figure 9:
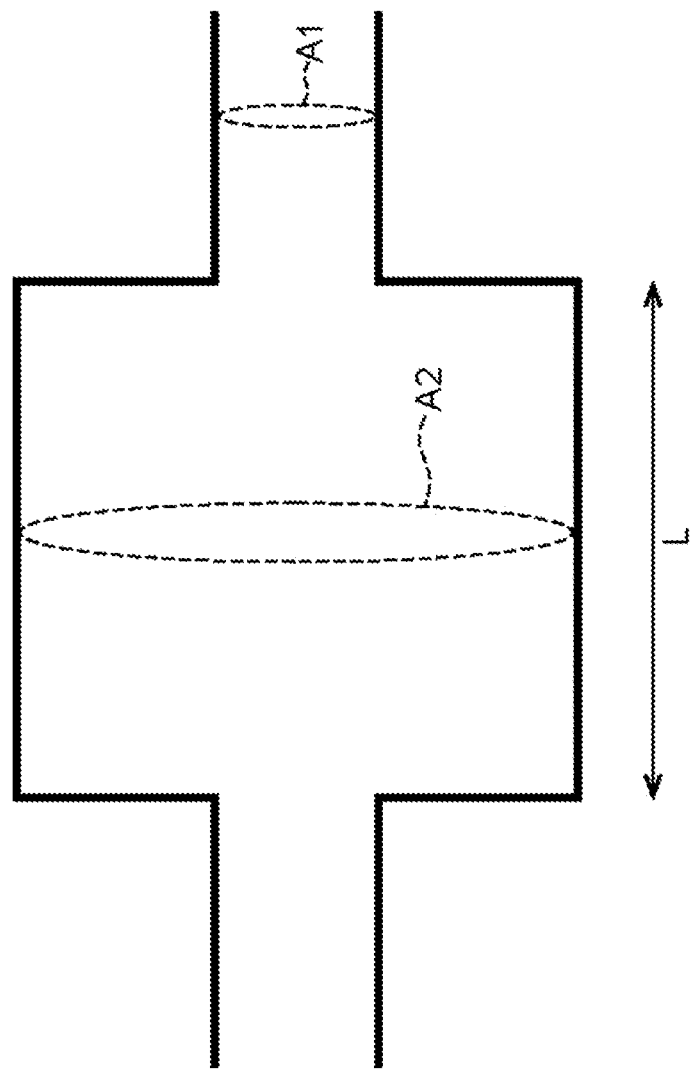
FIG. 9 is a typical view showing a simplified expansion silencer.

FIG. 9 shows a simplified expansion silencer. A1 is the entry pipe cross-sectional area, while A2 is the expansion pipe cross-sectional area. L is the length of the expansion pipe.

At this time, transmission loss TL is expressed using the following Formula 1. As can be understood from Formula 1, the larger a ratio M of the expansion pipe cross-sectional area A2 relative to the entry pipe cross-sectional area A1 (i.e., the larger the cross-sectional area ratio), the greater the transmission loss TL (i.e., the greater the noise insulation effect). Moreover, the resonance frequency is determined by the length L of the expansion pipe. Note that k is the wave number of the sound waves.

$$TL = 10 \log \{1 + \tfrac{1}{4}(M - 1/M)^2 \sin^2(kL)\} \qquad \text{[Formula 1]}$$

Moreover, as has been described above, the width H1 in the vehicle up-down direction of the corner upper space 301 is smaller than the width D in the vehicle up-down direction and the width W1 in the vehicle transverse direction of the first space 302.

Here, because, unlike the width in the vehicle transverse direction, the width in the vehicle up-down direction of the door lower space 300 can be designed without having to consider the door over stroke requirements, this width can be designed to be comparatively narrow.

Because of this, it is easy to design a large ratio of the cross-sectional area of the noise entry path of the first space 302 relative to the corner upper space 301. Accordingly, the noise insulation effect can be improved efficiently.

Moreover, in the vehicle side portion structure S1 according to the first exemplary embodiment, the seal-contacting vertical surface 103 is provided so as to extend substantially towards the vehicle upper side from the end portion on the inner side in the vehicle transverse direction of the first upper surface 104. In addition, the door WS 16 contacts a portion on the vehicle upper side of the seal-contacting vertical surface 103.

As a consequence of this, because the first space 302 is formed on the outer side in the vehicle transverse direction of the portion of the seal-contacting vertical surface 103 that the door WS 16 does not contact, a large first space 302 can be formed. Accordingly, the noise insulation effect can be improved even more efficiently.

Moreover, in the vehicle side portion structure S1 according to the first exemplary embodiment, the second upper surface 107 is provided so as to extend outwards in the vehicle transverse direction from the end portion on the lower side of the first vertical surface 106, and the second vertical surface 109 is provided so as to extend downwards from the end portion (i.e., the second corner surface 108) on the outer side in the vehicle transverse direction of the second upper surface 107.

Because of this, the cross-sectional area of the door lower space 300 that is perpendicular to the noise entry path can be reduced efficiently. Accordingly, the noise insulation effect can be improved even more efficiently.

Moreover, in the vehicle side portion structure S1 according to the first exemplary embodiment, the lower end portion of the front side door 20F faces an aperture lower edge portion (specifically, the rocker molding 50) in the vehicle up-down direction to form a vehicle outer side gap portion 305. In addition, at least one of a portion of the front side door 20F or a portion of the aperture lower edge portion (i.e. the side outer panel 70 and the rocker molding 50) is provided on a virtual straight line connecting the vehicle outer side gap portion 305 with the door WS 16 on a perpendicular cross-section relative to the vehicle front-rear direction.

Because of this, it is difficult for water entering though the vehicle outer side gap portion 305 to directly reach the door WS 16. Accordingly, it is difficult for water to enter the vehicle cabin interior 600.

Note that the virtual straight line connecting the door WS 16 to the vehicle outer side gap portion 305 on a perpendicular cross-section relative to the vehicle front-rear direction is not limited to a single type. Irrespective of the type of straight line that is used to join together at least a portion of the door WS 16 and at least a portion of the vehicle outer side gap portion 305, the foregoing description refers to at least one of a portion of the front side door 20F and a portion of the aperture lower edge portion (i.e. the side outer panel 70 and the rocker molding 50) being located on this virtual straight line.

Second Embodiment

Hereinafter, a vehicle 11 in which a vehicle side portion structure S2 according to a second exemplary embodiment of the technology of the present disclosure has been used will be described.

In the vehicle 11 in which the vehicle side portion structure S2 has been employed, instead of the rocker molding 50 of the first exemplary embodiment, a rocker molding 60 having a different structure is provided. The remaining structure is the same as in the first exemplary embodiment. Note that the rocker molding 60 is an example of an 'aperture lower edge portion' according to the technology of the present disclosure.

Hereinafter, the structure of the rocker molding 60 of the second exemplary embodiment will be described.

Figure 7:
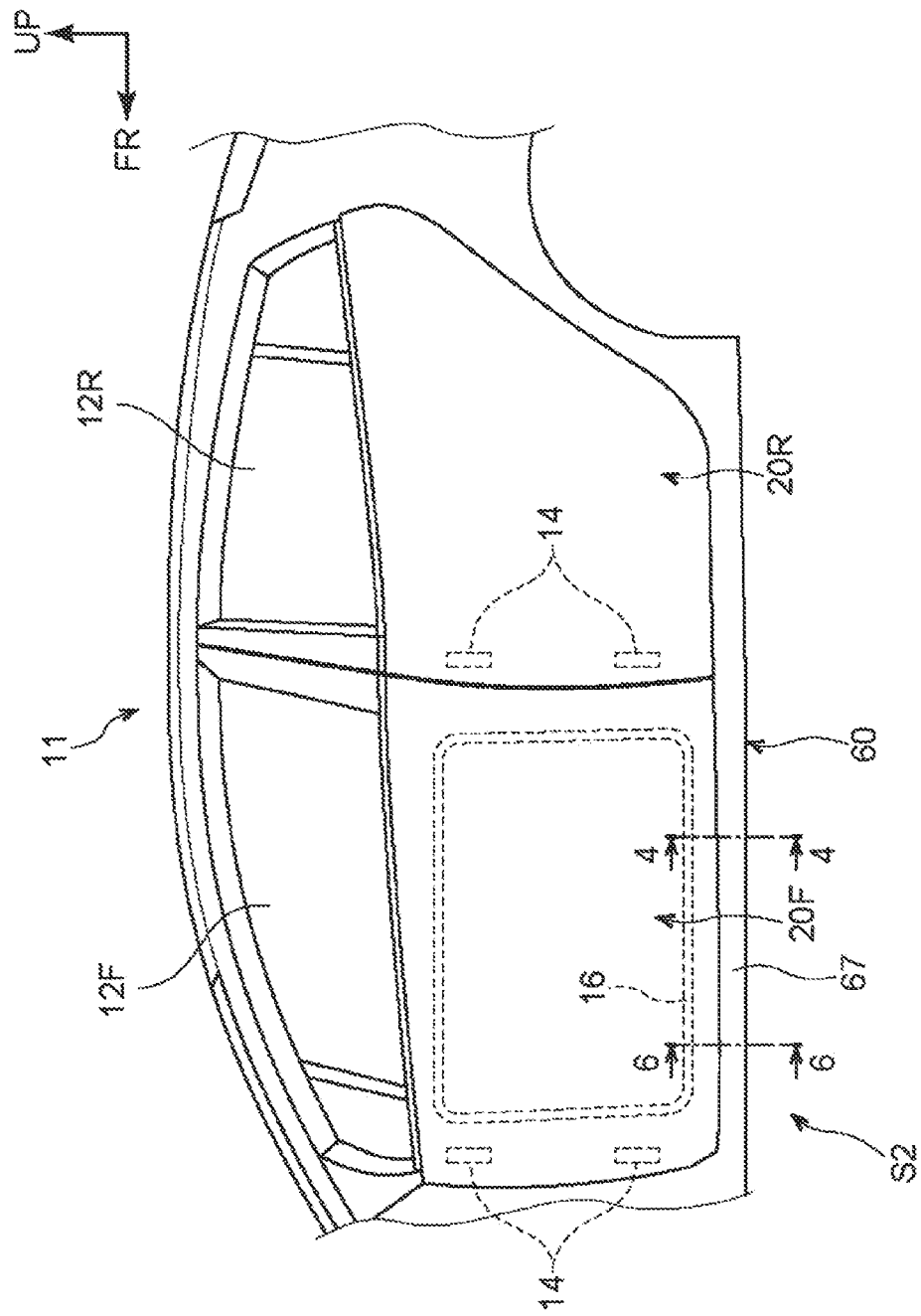
FIG. 7 is a side view of a vehicle in which the vehicle side portion structure of the second exemplary embodiment has been employed.

In the same way as for the rocker molding 50 of the first exemplary embodiment (see FIG. 1), the rocker molding 60 of the second exemplary embodiment is formed so as to include a portion (this portion is not shown in FIG. 7) that is hidden from the vehicle exterior side by the front side-door 20F when the front side door 20F is closed, and a portion (this portion is shown in FIG. 7) that is not hidden by the front side-door 20F even when the front side-door 20F is closed.

This portion that is not hidden is formed so as to include a side wall portion 67. The side wall portion 67 is a portion disposed below the door outer panel 30 in a state in which the closed front side-door 20F is viewed from the side of the vehicle. The side wall portion 67 is shaped so as to substantially conform to a virtual surface that would be formed if the main body portion 31 of the door outer panel 30 were extended downwards in a state in which the front side-door 20F is closed. A base wall portion 68 extends inwards in the vehicle transverse direction from a lower end of the side wall portion 67.

Next, the aforementioned hidden portion will be described.

A bottommost base wall 66 whose plate thickness direction is substantially in the vehicle up-down direction is formed extending inwards in the vehicle transverse direction from an upper end of the side wall portion 67. A second vertical wall portion 65 whose plate thickness direction is substantially in the vehicle transverse direction is formed extending towards the vehicle upper side from an end portion on the inner side in the vehicle transverse direction of the bottommost base wall 66. A lower wall portion 64 whose plate thickness direction is substantially in the vehicle up-down direction is formed extending outwards in the vehicle transverse direction from an upper end of the second vertical wall portion 65. A first vertical wall portion 63 whose plate thickness direction is substantially in the vehicle transverse direction is formed extending towards the vehicle upper side from an end portion on the inner side in the vehicle transverse direction of the lower wall portion 64. A first upper wall portion 62 whose plate thickness direction is substantially in the vehicle up-down direction is formed extending inwards in the vehicle transverse direction from an upper end of the first vertical wall portion 63. An uppermost portion 61 whose plate thickness direction is substantially in the vehicle transverse direction is formed extending towards the vehicle upper side from an end portion on the inner side in the vehicle transverse direction of the first upper wall portion 62. The uppermost portion 61 is disposed on the lower side of the side wall portion 73 of the side outer panel 70.

As a consequence, a vehicle body-side wall surface 400 of the second exemplary embodiment is formed in the following manner.

Figure 5:
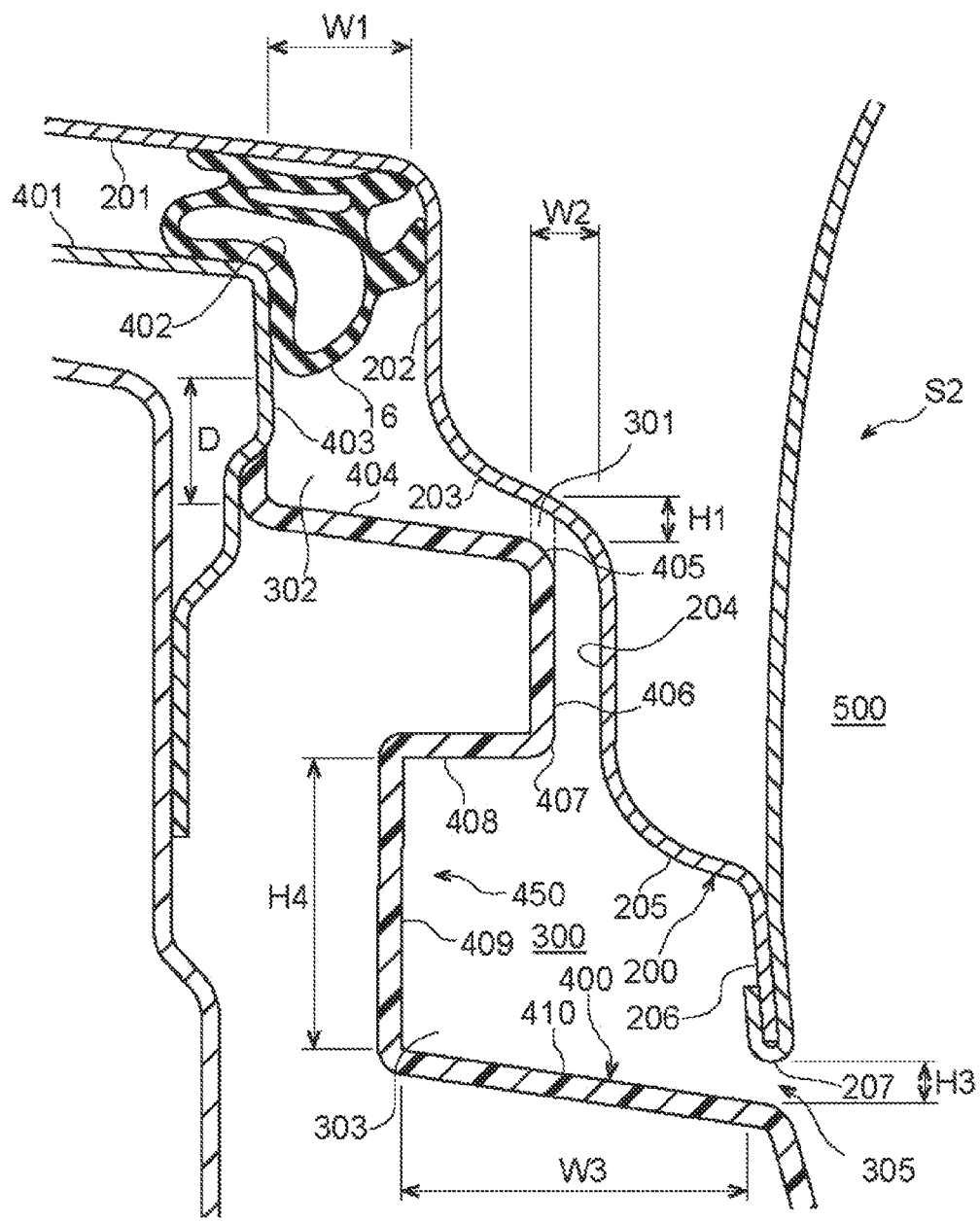
FIG. 5 is an enlarged view showing principal portions of FIG. 4.

Namely, as an example, as is shown in FIG. 5, the vehicle body-side wall surface 400 is formed by a top surface 401, a seal-contacting corner surface 402, a seal-contacting vertical surface 403, a first upper surface 404, a first corner surface 405, a first vertical surface 406, a second corner surface 407, a lower surface 408, a second vertical surface 409, and a bottommost base surface 410. Note that the first upper surface 404 is an example of an 'upper surface' according to the technology of the present disclosure, the first corner surface 405 is an example of a 'corner surface' according to the technology of the present disclosure, and the first vertical surface 406 is an example of a 'vertical surface' according to the technology of the present disclosure.

The top surface 401 forms an uppermost portion in the vehicle up-down direction of the vehicle body-side wall surface 100. The top surface 401 is an external surface of the top wall portion 72 of the side outer panel 70, and a normal direction thereof is substantially towards the vehicle upper side. The top surface 401 faces the bulge surface 201 of the door-side wall surface 200 in the vehicle up-down direction. The door WS 16 contacts a portion on the outer side in the vehicle transverse direction of the top surface 101.

The seal-contacting corner surface 402 is provided so as to be continuous with the outer side in the vehicle transverse direction of the top surface 401. The seal-contacting corner surface 402 is an external surface of a boundary portion between the top wall portion 72 and the side wall portion 73 of the side outer panel 70. The door WS 16 contacts the seal-contacting corner portion 402.

The seal-contacting vertical surface 403 is provided at a lower side of the seal-contacting corner surface 402. A normal direction of the seal-contacting vertical surface 403 is outwards in the vehicle transverse direction. An upper portion of the seal-contacting vertical surface 403 is an external surface of the side wall portion 73 of the side outer panel 70, while a lower portion of the seal-contacting vertical surface 103 is an external surface of the uppermost portion 61 of the rocker molding 60. The door WS 16 contacts a portion on the vehicle upper side of the seal-contacting vertical surface 403. The seal-contacting vertical surface 403 faces the inner side vertical surface 202 and the inner side step surface 203 of the door-side wall surface 200 in the vehicle transverse direction.

The first upper surface 404, which is serving as an 'upper surface', is provided facing outwards in the vehicle transverse direction from an end portion on the lower side of the seal-contacting vertical surface 403. The first upper surface 404 is an external surface of the first upper wall portion 62 of the rocker molding 60, and a normal direction thereof is substantially towards the vehicle upper side. More specifically, the first upper surface 404 slopes slightly downwards and outwards in the vehicle transverse direction. A portion on the inner side in the vehicle transverse direction of the first upper surface 404 faces the door WS 16 in the vehicle up-down direction, and a portion on the outer side in the vehicle transverse direction of the first upper surface 404 faces a portion on the inner side in the vehicle transverse direction of the inner side step portion 203 of the door-side wall surface 200 in the vehicle up-down direction.

The first corner surface 405, which is serving as a 'corner surface', is provided on the outer side in the vehicle transverse direction of the first upper surface 404. The first corner surface 405 is an external surface of a boundary portion between the first upper wall portion 62 and the first vertical wall portion 63 of the rocker molding 60. The first corner surface 405 faces a portion of the inner side step surface 203 of the door-side wall surface 200 in the vehicle up-down direction.

The first vertical surface 406, which is serving as a 'vertical surface', is provided facing downwards from the first corner surface 405. The first vertical surface 406 is an external surface of the first vertical wall portion 63 of the rocker molding 60, and a normal direction thereof is outwards in the vehicle transverse direction. The first vertical surface 406 faces the outer side vertical surface 204 of the door-side wall surface 200 in the vehicle transverse direction.

The second corner surface 407 is provided at an end portion on the lower side of the first vertical surface 406. The second corner surface 407 is an external surface of a boundary portion between the first vertical wall portion 63 and the lower wall portion 64 of the rocker molding 60.

The lower surface 408 is provided facing inwards in the vehicle transverse direction from the second corner surface 407. The lower surface 408 is an external surface of the lower wall portion 64 of the rocker molding 60, and a normal direction thereof is substantially downwards.

The second vertical surface 409 is provided facing downwards from an end portion on the inner side in the vehicle transverse direction of the lower surface 408. The second vertical surface 409 is an external surface of the second vertical wall portion 65 of the rocker molding 60, and a normal direction thereof is outwards in the vehicle transverse direction. The second vertical surface 409 faces the outer side step surface 205 and the outermost vertical surface 206 of the door-side wall surface 200 in the vehicle transverse direction.

The bottommost base surface 410 is provided facing outwards in the vehicle transverse direction from an end portion on the lower side of the second vertical surface 409. The bottommost base surface 410 is an external surface of the bottommost base wall 66 of the rocker molding 60, and a normal direction thereof faces substantially towards the vehicle upper side. More specifically, the bottommost base surface 410 slopes downwards and outwards in the vehicle transverse direction. The bottommost base surface 410 faces the lower surface 408 of the vehicle body-side wall portion 400, as well as the inner side step surface 203, the outer side step surface 205 and the bottommost surface 207 of the door-side wall surface 200 in the vehicle up-down direction.

(Width of the Door Lower Space)

Next, the gap (i.e., the dimensional relationship) between the vehicle body-side wall surface 400 and the door-sidewall surface 200 will be described.

Note that, as an example, as is shown in FIG. 5, a gap in the vehicle transverse direction between the seal-contacting vertical surface 403 and the inner side vertical surface 202 is taken as a gap W1, a gap in the vehicle transverse direction between the first vertical surface 406 and the outer side vertical surface 204 is taken as a gap W2, and a gap in the vehicle transverse direction between the second vertical surface 409 and the outermost vertical surface 206 is taken as a gap W3.

Moreover, a gap in the vehicle up-down direction between the first corner surface 405 and the inner side step surface 203 is taken as H1, and a gap in the vehicle up-down direction between the bottommost base surface 410 and the bottommost surface 207 is taken as H3. In addition, a dimension in the vehicle up-down direction of the second vertical surface 409 is taken as H4.

However, it is not essential that the mutually facing surfaces that define the aforementioned gaps are in a parallel relationship with each other. Because of this, the gaps in the vehicle transverse direction vary depending on the position in the vehicle up-down direction where they are measured, and the gaps in the vehicle up-down direction vary depending on the position in the vehicle transverse direction where they are measured. In this case, each of the gap W1, the gap W2, the gap W3, and the gap H1 refer to the minimum value of the gap measured in a portion where the vehicle body-side wall surface 400 and the door-side wall surface 200 are facing each other.

Moreover, of the door lower space 300, a space positioned on the vehicle upper side of the first corner surface 405 is referred to as a corner upper space 301, while a space between the corner upper space 301 and the door WS 16 is referred to as a first space 302.

The gap W1, the gap W2, and the gap W3 in the vehicle transverse direction are set after considering the over stroke requirements of the side door (namely, the gap required to prevent the side door from interfering with the vehicle body when the side door is closed). Because of this, in the present exemplary embodiment, the gap W1, the gap W2, and the gap W3 are all set as gaps of not less than 11 mm.

In contrast to this, there is no need to consider the door over stroke requirements when setting the gap H1 in the vehicle up-down direction. Accordingly, compared to the gap W1, the gap W2, and the gap W3 in the vehicle transverse direction, the gap H1 in the vehicle up-down direction can be set as a narrow gap. Specifically, the following relationships are established.

Namely, the gap H1 is smaller than the gap W1 (H1<W1), specifically, the gap H1 is one half or less the size of the gap W1. In other words, the width H1 in the vehicle up-down direction of the corner upper space 301 is smaller than the width W1 in the vehicle transverse direction of the first space 302.

Furthermore, a gap D in the vehicle up-down direction between the first upper surface 404 and the door WS 16 is larger than the gap H1. In other words, the width H1 in the vehicle up-down direction of the corner upper space 301 is smaller than the width D in the vehicle up-down direction of the first space 302.

Accordingly, the width H1 in the vehicle up-down direction of the corner upper space 301 is smaller than the width W1 in the vehicle transverse direction of the first space 302, and is also smaller than the width D in the vehicle up-down direction of the first space 302.

Moreover, the gap H1 is also smaller than the gap W2 (H1<W2).

A recessed surface 450 that is recessed further towards the inner side in the vehicle transverse direction than the first vertical surface 406 is formed on the lower side of the first vertical surface 406 by portions of the lower surface 408, the second vertical surface 409, and the bottommost base surface 410 of the vehicle body-side wall surface 400. As a result, the width W3 of the door lower space 300 (i.e., the second space 303) measured in the vehicle transverse direction from the recessed surface 450 is made larger than the width W2 of the door lower space 300 measured in the vehicle transverse direction from the first vertical surface 406.

Figure 4:
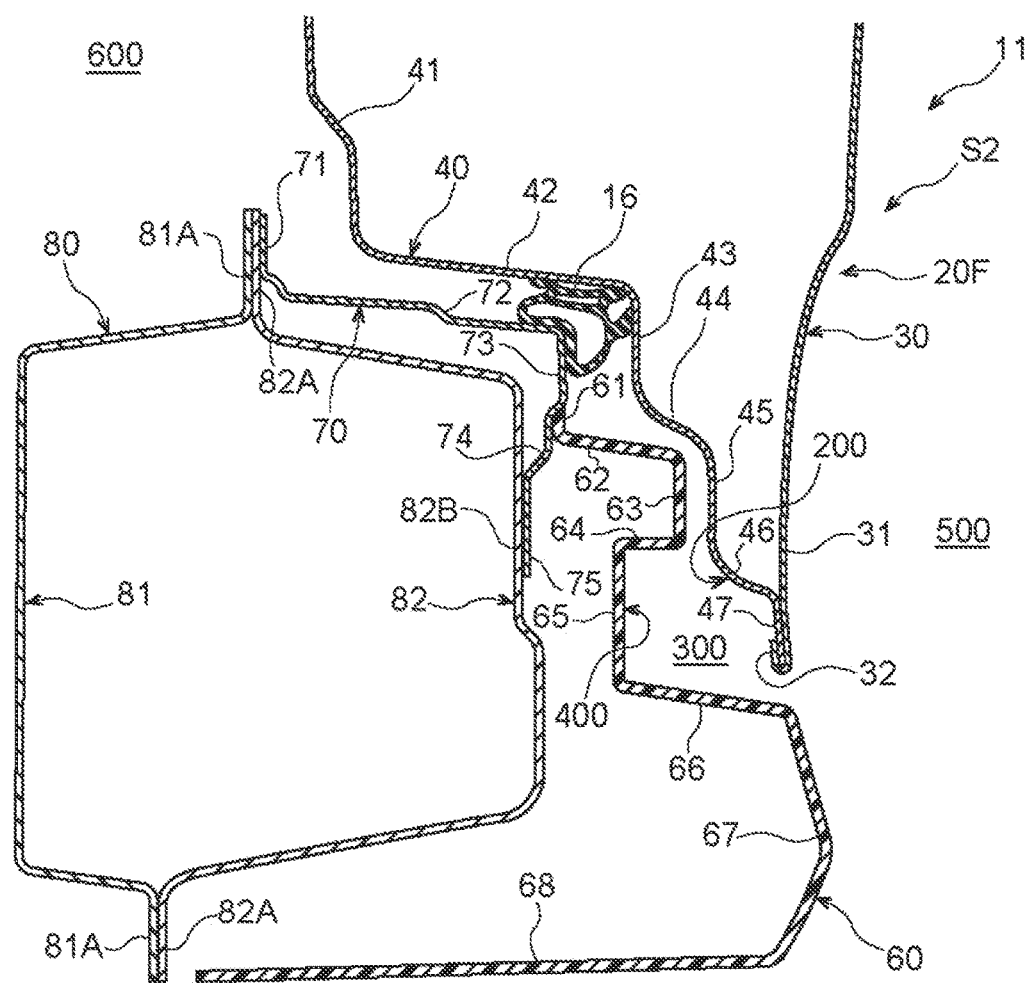
FIG. 4 is a view showing a cross-section taken along a plane which is perpendicular to the vehicle front-rear direction (i.e., a cross-sectional view taken along a line 4-4 in FIG. 7) showing a vehicle side portion structure of a second exemplary embodiment.
Figure 6:
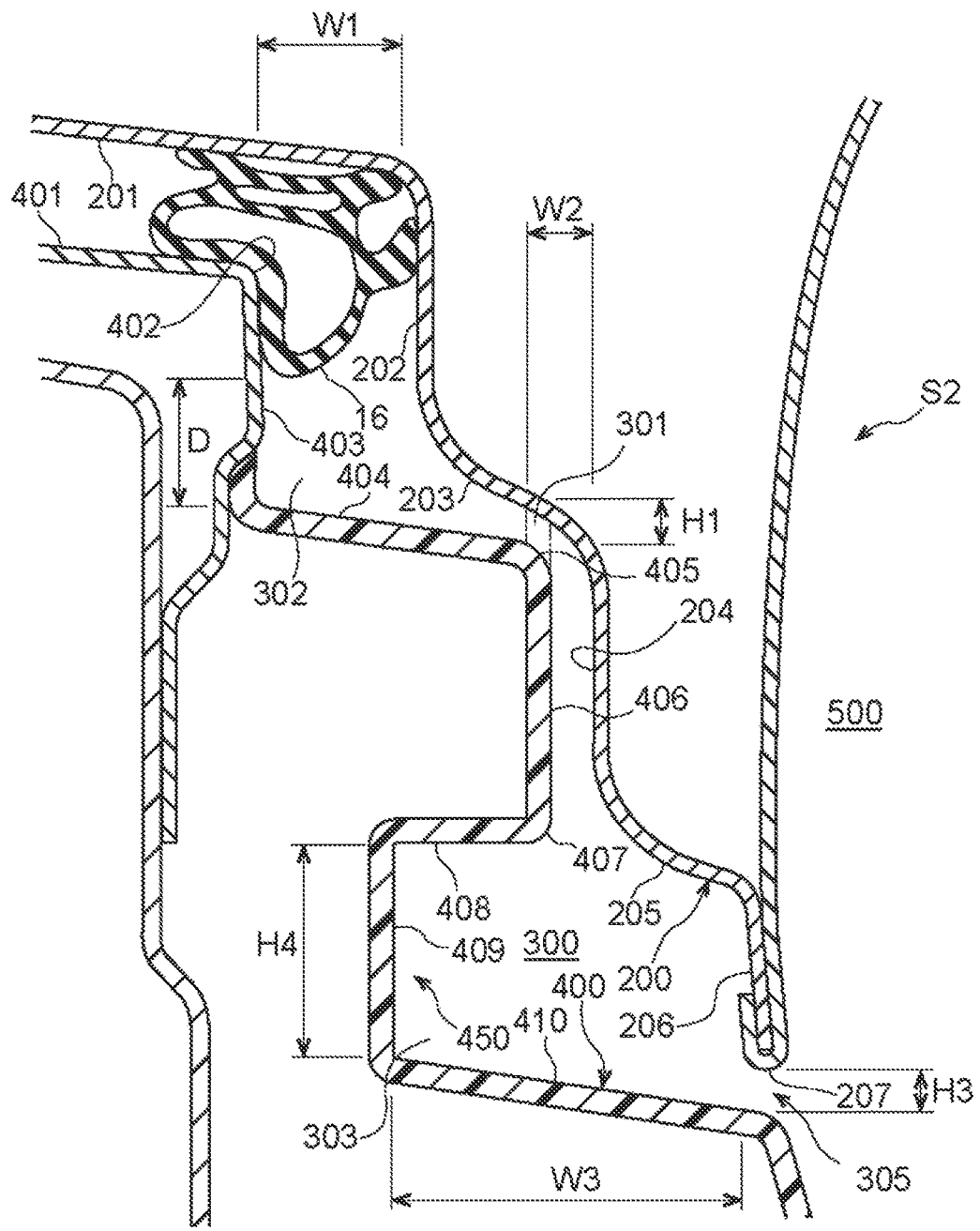
FIG. 6 is a view showing a cross-section taken along a plane which is perpendicular to the vehicle front-rear direction (i.e., a cross-sectional view taken along a line 6-6 in FIG. 7) at a different position (i.e., a different position in the vehicle front-rear direction) from that shown in FIG. 5.

FIG. 6 is a cross-sectional view (i.e., a cross-sectional end view) taken along a line 6-6 in FIG. 7, namely, FIG. 6 shows a cross-section on the vehicle forward side of the cross-section shown in FIG. 4 and FIG. 5. As an example, as is shown in FIG. 5, and FIG. 6, the dimension H4 in the vehicle up-down direction of the second vertical surface 409 changes depending on the position thereof in the vehicle front-rear direction. More specifically, a structure is employed in which the dimension H4 becomes gradually smaller moving from the vehicle rearward side towards the vehicle forward side. In conjunction with this, the lower surface 408 is inclined relative to the vehicle front-rear direction. More specifically, the lower surface 408 is inclined relative to the vehicle front-rear direction so as to be gradually displaced downwards moving from the vehicle rearward side towards the vehicle forward side.

[Operational Effects]

Next, operational effects of the vehicle side portion structure according to the second exemplary embodiment will be described.

In the vehicle side portion structure S2 of the second exemplary embodiment, the front side-door aperture portion 12F is provided in a vehicle side portion, and the front side-door 20F is provided such it is able to open and close this front side-door aperture portion 12F. Furthermore, as an example, as is shown in FIG. 4, in a state in which the front side-door 20F is closed, the door lower space 300 is formed between the aperture lower edge portion (i.e., the side outer panel 70 and the rocker molding 50) forming the vehicle lower side portion of the front side-door aperture portion 12F and the front side-door 20F. The door WS 16 is provided to seal the door lower space 300.

As an example, as is shown in FIG. 5, the vehicle body-side wall surface 400, which is the wall surface on the aperture lower edge portion-side of the door lower space 300, is formed so as to include the first upper surface 404 whose normal direction is substantially towards the vehicle upper side, the first corner surface 405 that is formed at an end portion on the outer side in the vehicle transverse direction of the first upper surface 404, and the first vertical surface 406 that extends substantially downwards from the first corner surface 405. The door lower space 300 is formed so as to include the corner upper space 301, which is the space positioned on the vehicle upper side of the first corner surface 405, and the first space 302, which is adjacent to the vehicle outer side of the door WS 16 and is the space between the door WS 16 and the corner upper space 301. Furthermore, the width H1 in the vehicle up-down direction of the corner upper space 301 is smaller than the width W1 in the vehicle transverse direction of the first space 302, and is also smaller than the width D in the vehicle up-down direction of the first space 302.

Because a structure such as that described above is employed, the first space 302 is formed in front of the door WS 16 on the path by which noise from the vehicle exterior 500 enters into the vehicle cabin interior 600 through the door lower space 300, and the corner upper space 301 whose perpendicular cross-sectional area relative to the noise entry path is smaller than that of the first space 302 is formed in front of the first space 302.

Because of this, a portion of the noise entering the door lower space 300 from the vehicle exterior 500 is absorbed by the door WS 16, and a portion thereof is reflected. The reflected portion of the noise is once again reflected between the first space 302 and the corner upper space 301. In this way, because a mechanism that reflects noise both in front of and behind the first space 302 is provided, noise from the vehicle exterior 500 entering the vehicle cabin interior 600 can be reduced by employing the same principle as that used in an expansion silencer.

Moreover, as has been described above, the width H1 in the vehicle up-down direction of the corner upper space 301 is smaller than the width D in the vehicle up-down direction and the width W1 in the vehicle transverse direction of the first space 302.

Here, because, unlike the width in the vehicle transverse direction, the width in the vehicle up-down direction of the door lower space 300 can be designed without having to consider the door over stroke requirements, this width can be designed to be comparatively narrow.

Because of this, it is easy to design a large ratio for the cross-sectional area of the noise entry path of the first space 302 relative to the corner upper space 301. Accordingly, the noise insulation effect can be improved efficiently.

Moreover, in the vehicle side portion structure S2 according to the second exemplary embodiment, the seal-contacting vertical surface 403 is provided so as to extend substantially towards the vehicle upper side from an end portion on the inner side in the vehicle transverse direction of the first upper surface 404. In addition, the door WS 16 contacts a vehicle upper side portion of the seal-contacting vertical surface 403.

As a consequence of this, because the first space 302 is formed on the outer side in the vehicle transverse direction of the portion of the seal-contacting vertical surface 403 that the door WS 16 does not contact, a large first space 302 can be formed. Accordingly, the noise insulation effect can be improved even more efficiently.

Moreover, in the vehicle side portion structure S2 according to the second exemplary embodiment, the lower end portion of the front side door 20F faces the aperture lower edge portion (specifically, the rocker molding 50) in the vehicle up-down direction so as to form the vehicle outer side gap portion 305. In addition, at least one of a portion of the front side door 20F or a portion of the aperture lower edge portion (i.e. the side outer panel 70 and the rocker molding 50) is provided on a virtual straight line connecting the vehicle outer side gap portion 305 with the door WS 16 on a perpendicular cross-section relative to the vehicle front-rear direction.

Because of this, it is difficult for water entering though the vehicle outer side gap portion 305 to directly reach the door WS 16. Accordingly, it is difficult for water to enter the vehicle cabin interior 600.

Moreover, in the vehicle side portion structure S2 according to the second exemplary embodiment, the recessed surface 450 that is recessed further towards the outer side in the vehicle transverse direction than the first vertical surface 406 is provided on the lower side of the first vertical surface 406. In addition, the width W3 of the door lower space 300 measured in the vehicle transverse direction from the recessed surface 450 is made larger than the width W2 of the door lower space 300 measured in the vehicle transverse direction from the first vertical surface 406.

Because of this, a portion of the noise entering from the vehicle exterior 500 is reflected between the second space 300, which is the enlarged door lower space located on the outer side in the vehicle transverse direction of the recessed surface 450, and the door lower space 300, which is located on the outer side in the vehicle transverse direction of the first vertical surface 406. Accordingly, the noise insulation effect can be improved even more efficiently.

Moreover, in the vehicle side portion structure S2 according to the second exemplary embodiment, the recessed surface 450 is formed so as to include a lower surface 408 that extends towards the inner side in the vehicle transverse direction from an end portion (i.e., the second corner surface 407) on the vehicle lower side of the vertical surface 406. In addition, the lower surface 408 is inclined relative to the vehicle front-rear direction.

Because of this, any water that runs along the first vertical surface 406 and drips onto the lower surface 408 runs along this lower surface 408 which slopes relative to the vehicle front-rear direction, and flows towards one side in the vehicle front-rear direction (in the present exemplary embodiment, water runs towards the vehicle front side). Accordingly, drainage is excellent.

Moreover, in the vehicle side portion structure S2 according to the second exemplary embodiment, the front side-door 20F is a hinged door that is provided with the hinges 14 on the vehicle front side. In addition, the lower surface 408 of the vehicle body-side wall surface 400 is inclined in a downward direction towards the vehicle front side.

Because of this, any water flowing along the lower surface flows towards the vehicle front side in this vehicle front-rear direction, which is where the side door hinges are provided. Accordingly, it is difficult for water to drip onto the feet of a person getting into or out of a vehicle.

Moreover, in the vehicle side portion structure S2 according to the second exemplary embodiment, as an example, as is shown in FIG. 5, and FIG. 6, the dimension H4 in the vehicle up-down direction of the second vertical surface 409 changes depending on the position thereof in the vehicle front-rear direction. As a consequence of this, the dimension in the vehicle up-down direction of the recessed surface 450 changes depending on the position thereof in the vehicle front-rear direction. As a result, the size in the vehicle up-down direction of the second space 302, which is the door lower space 300 on the outer side on the vehicle transverse direction of the second vertical surface 409, changes depending on the position thereof in the vehicle front-rear direction. Namely, the length of the second space 303 (i.e., the length measured on the noise entry path) changes depending on the position in the vehicle front-rear direction. Because of this, a noise insulation effect can be demonstrated against noise across a wide frequency band.

Test Examples

Figure 8:
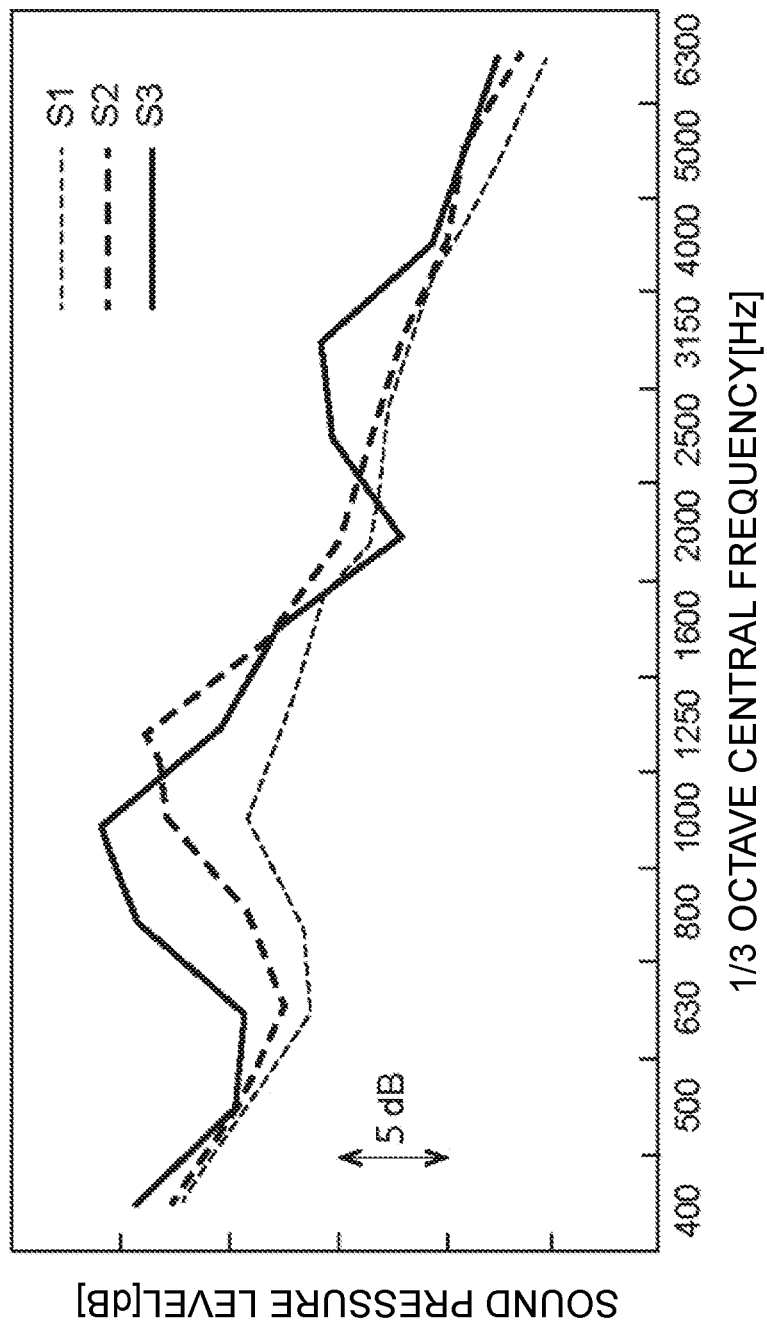
FIG. 8 is a graph showing test results in a case in which noise insulation effects obtained from the vehicle side portion structures of the first exemplary embodiment, the second exemplary embodiment, and a comparative example were compared.

Lastly, results for tests performed for the vehicle side portion structure S1 according to the first exemplary embodiment, the vehicle side portion structure S2 according to the second exemplary embodiment, and a vehicle side portion structure S3 according to a comparative example are shown in FIG. 8.

A vertical axis in FIG. 8 is a noise pressure level (dB) of transmission noise (i.e., noise that has entered the space), and a smaller value indicates a greater noise insulation effect. A horizontal axis in FIG. 8 is a central frequency (Hz) of the noise.

Figure 10:
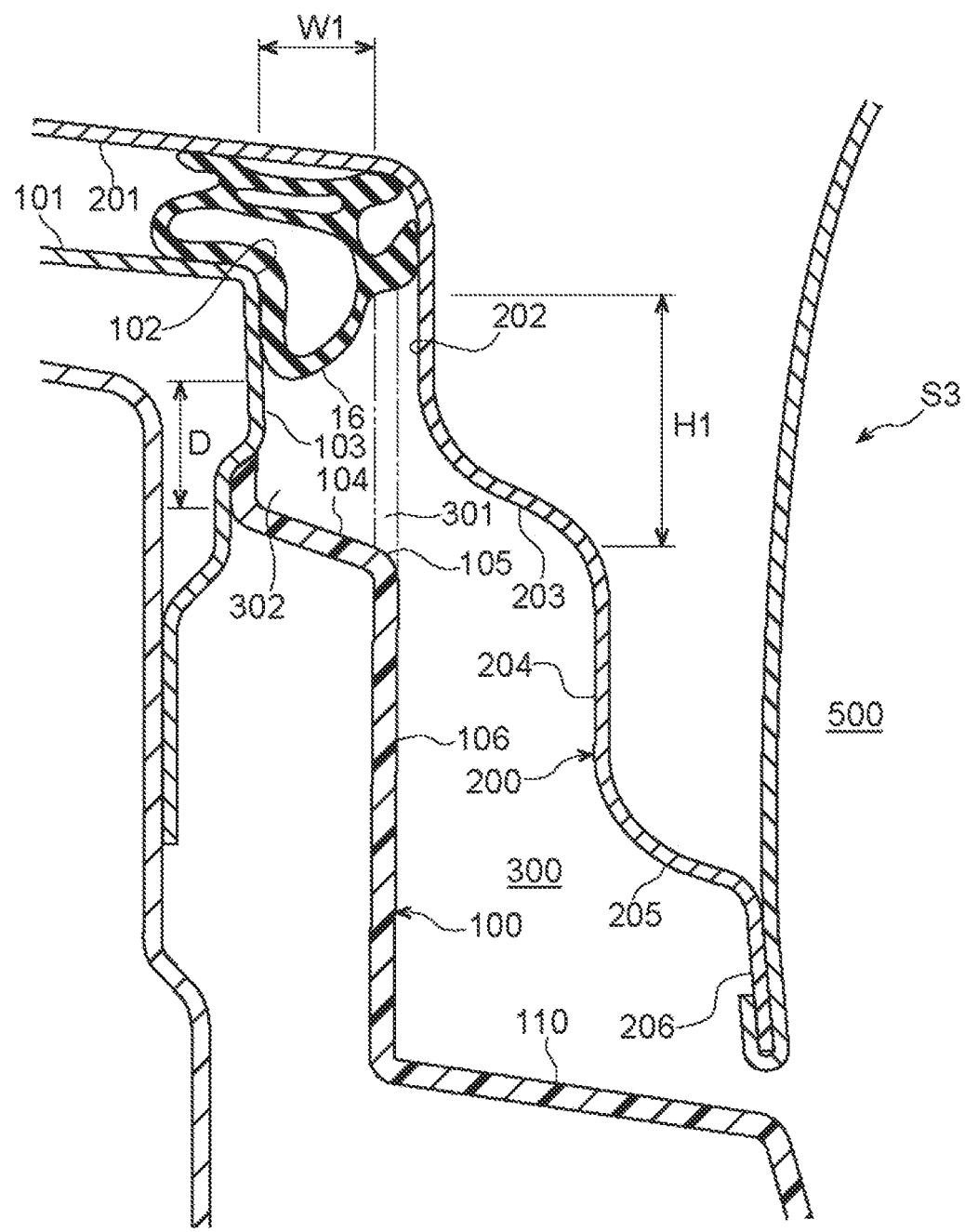
FIG. 10 is an enlarged view showing principal portions of a vehicle side portion structure of a comparative example.

Note that the comparative example uses the vehicle side portion structure S3 shown in FIG. 10. As an example, as is shown in FIG. 10, in the vehicle side portion structure S3, the first corner surface 105 does not lie opposite the inner side step surface 203 of the door side wall surface 200 in the vehicle up-down direction, but, instead, lies opposite the door WS 16 in the vehicle up-down direction. As a result, the width H1 in the vehicle up-down direction of the corner upper space 301 is not smaller than the width W1 in the vehicle transverse direction of the first space 302, but is, instead, larger than the width W1. Furthermore, the width H1 is not smaller than the width D in the vehicle up-down direction of the first space 302, but is, instead, larger than the width D.

In the vehicle side portion structure S3, the second upper surface 107, the second corner surface 108, and the second vertical surface 109 are not provided between the first vertical surface 106 and the bottommost base surface 110, as in the first exemplary embodiment and, instead, the first vertical surface 106 is connected to the bottommost base surface 110.

As an example, as is shown in FIG. 8, in a frequency band of 630 to 1000 Hz, compared to the vehicle side portion structure S3 of the comparative example, in the vehicle side portion structures S1 and S2 of the first and second exemplary embodiments, it was confirmed that noise pressure levels are greatly reduced, and the noise insulation effect is greatly increased.

[Supplementary Description to the Above-Described Embodiment]

Note that, in the above-described embodiment, an example is described in which the aperture lower edge portion that forms the door lower space 300 between itself and the front side-door 20F is formed by external surfaces of the side door outer 70 and the rocker molding 50, however, the technology of the present disclosure is not limited to this. For example, the aperture lower edge portion may be formed solely by a rocker molding, or may be formed by other members in addition to a side door outer and a rocker molding.

Moreover, in the second exemplary embodiment, an example in which the lower surface 408 is parallel with the vehicle transverse direction is described (see FIG. 5), however, the technology of the present disclosure is not limited to this. For example, it is also possible for the lower surface 408 to be inclined relative to the vehicle transverse direction, and to slope downwards and outwards in the vehicle transverse direction. In this case, water running over the first vertical surface 406 collects on the second corner surface 407 so that drainage is improved even more.

Moreover, in the above-described exemplary embodiment, the front side-door 20F is described as the side door of the technology of the present disclosure, however, the side door of the technology of the present disclosure is not limited to this, and may also be a rear side-door. Moreover, the vehicle side portion structure of the technology of the present disclosure may also be applied to both a front side-door and a rear side-door.

All references, patent applications and technical specifications cited in the present specification are incorporated by reference into the present specification to the same extent as if the individual references, patent applications and technical specifications were specifically and individually recited as being incorporated by reference.

What is claimed is:

1. A vehicle side portion structure comprising:
an aperture lower edge portion that forms a portion at a vehicle lower side of a door aperture portion that is provided at a vehicle side portion;
a side door that is configured to open and close the door aperture portion, and a door lower space being formed between the side door and the aperture lower edge portion in a state in which the door aperture portion is closed; and
a sealing member that seals the door lower space, wherein
a vehicle body-side wall surface, which is a wall surface at a side of the aperture lower edge portion of the door lower space, is formed so as to include:
an upper surface having a normal direction that is substantially towards a vehicle upper side;
a corner surface that is formed at an end portion at an outer side in a vehicle transverse direction of the upper surface; and
a vertical surface that extends substantially towards a vehicle lower side from the corner surface, and wherein
the door lower space is formed so as to include:
a corner upper space, which is a space located at a vehicle upper side of the corner surface; and
a first space, which is adjacent to a vehicle outer side of the sealing member, and is a space between the sealing member and the corner upper space, and wherein
in the door lower space, no other sealing member is provided on the vehicle outer side of the sealing member,
a width in a vehicle up-down direction of the corner upper space is less than a width in the vehicle up-down direction of the first space, and is also less than a width in the vehicle transverse direction of the first space, and
at least the upper surface and a surface of the vehicle outer side of the upper surface among the vehicle body-side wall surface is formed as a part of a rocker molding made of resin, the rocker molding being formed so as to include a part which is hidden by the side door from the vehicle outer side in a state in which the side door is closed and a part which is not hidden by the side door from the vehicle outer side even in a state in which the side door is closed.

2. The vehicle side portion structure according to claim 1, wherein
the vehicle body-side wall surface is formed so as to further include a seal-contacting vertical surface that extends substantially at the vehicle upper side from an end portion at the inner side in the vehicle transverse direction of the upper surface, and
the sealing member contacts an upper portion of the seal-contacting vertical surface.

3. The vehicle side portion structure according to claim 1, wherein
the vehicle body-side wall surface is formed so as to further include:
a second upper surface that extends outwards in the vehicle transverse direction from an end portion at a vehicle lower side of the vertical surface; and
a second vertical wall that extends towards the vehicle lower side from an end portion at the outer side in the vehicle transverse direction of the second upper surface.

4. The vehicle side portion structure according to claim 1, wherein
the vehicle body-side wall surface is formed so as to further include a recessed surface that is provided at a vehicle lower side of the vertical surface and is recessed further inwards in the vehicle transverse direction than the vertical surface, and
a width of the door lower space measured in the vehicle transverse direction from the recessed surface is larger than a width of the door lower space measured in the vehicle transverse direction from the vertical surface.

5. The vehicle side portion structure according to claim 4, wherein the recessed surface is formed so as to include a lower surface that extends inwards in the vehicle transverse direction from an end portion at a vehicle lower side of the vertical surface, and the lower surface is inclined relative to a vehicle front-rear direction.

6. The vehicle side portion structure according to claim 5, wherein
the side door is a hinged door that is provided with hinges at one side in the vehicle front-rear direction, and
the lower surface is inclined, relative to a vehicle downward direction, towards one side in the vehicle front-rear direction.

7. A vehicle side portion structure comprising:
an aperture lower edge portion that forms a portion at a vehicle lower side of a door aperture portion that is provided at a vehicle side portion;
a side door that is configured to open and close the door aperture portion, and a door lower space being formed between the side door and the aperture lower edge portion in a state in which the door aperture portion is closed; and
a sealing member that seals the door lower space, wherein
a vehicle body-side wall surface, which is a wall surface at a side of the aperture lower edge portion of the door lower space, is formed so as to include:
an upper surface having a normal direction that is substantially towards a vehicle upper side;
a corner surface that is formed at an end portion at an outer side in a vehicle transverse direction of the upper surface; and
a vertical surface that extends substantially towards a vehicle lower side from the corner surface, and wherein
the door lower space is formed so as to include:
a corner upper space, which is a space located at a vehicle upper side of the corner surface; and
a first space, which is adjacent to a vehicle outer side of the sealing member, and is a space between the sealing member and the corner upper space, and wherein
a width in a vehicle up-down direction of the corner upper space is less than a width in the vehicle up-down direction of the first space, and is also less than a width in the vehicle transverse direction of the first space,
the vehicle body-side wall surface is formed so as to further include a recessed surface that is provided at a vehicle lower side of the vertical surface and is recessed further inwards in the vehicle transverse direction than the vertical surface,
a width of the door lower space measured in the vehicle transverse direction from the recessed surface is larger than a width of the door lower space measured in the vehicle transverse direction from the vertical surface,
the recessed surface is formed so as to include a lower surface that extends inwards in the vehicle transverse direction from an end portion at a vehicle lower side of the vertical surface, and
the lower surface is formed along an entire region extending in a vehicle front-rear direction including a center of the vehicle front-rear direction of the door aperture portion and is inclined relative to the vehicle front-rear direction.

8. The vehicle side portion structure according to claim 4, wherein the recessed surface is formed so as to include a lower surface that extends inwards in the vehicle transverse direction from an end portion at a vehicle lower side of the vertical surface, and the lower surface is inclined, relative to the vehicle transverse direction, downwards and outwards in the vehicle transverse direction.

* * * * *